(12) United States Patent
Ha et al.

(10) Patent No.: US 10,997,065 B2
(45) Date of Patent: May 4, 2021

(54) MEMORY SYSTEM AND OPERATING METHOD THEREOF

(71) Applicant: SK hynix Inc., Gyeonggi-do (KR)

(72) Inventors: Byung Min Ha, Gyeonggi-do (KR); Ji Yeun Kang, Gyeonggi-do (KR); Hae Lyong Song, Seoul (KR); Young Mi Yoon, Gyeonggi-do (KR); Min Kyung Choi, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 174 days.

(21) Appl. No.: 16/103,384

(22) Filed: Aug. 14, 2018

(65) Prior Publication Data

US 2019/0146911 A1    May 16, 2019

(30) Foreign Application Priority Data

Nov. 13, 2017  (KR) .................. 10-2017-0150761

(51) Int. Cl.
*G06F 12/02*    (2006.01)
*G06F 11/10*    (2006.01)

(52) U.S. Cl.
CPC ........ *G06F 12/0246* (2013.01); *G06F 11/108* (2013.01); *G06F 11/1068* (2013.01); *G06F 2212/7201* (2013.01); *G06F 2212/7203* (2013.01); *G06F 2212/7207* (2013.01)

(58) Field of Classification Search
None
See application file for complete search history.

(56) References Cited

U.S. PATENT DOCUMENTS

| | | | |
|---|---|---|---|
| 8,943,282 B1 * | 1/2015 | Armangau | G06F 16/128 711/162 |
| 9,053,012 B1 * | 6/2015 | Northcott | G11C 29/42 |
| 9,396,067 B1 * | 7/2016 | Subramanian | G06F 12/0866 |
| 9,697,219 B1 * | 7/2017 | Wang | G06F 16/1734 |
| 10,067,682 B1 * | 9/2018 | Chatterjee | G06F 12/0866 |
| 2011/0126045 A1 * | 5/2011 | Bennett | G06F 11/108 714/6.22 |
| 2018/0107408 A1 * | 4/2018 | Sterns | G06F 3/061 |
| 2019/0146906 A1 * | 5/2019 | Gholamipour | G06F 12/0246 711/103 |

FOREIGN PATENT DOCUMENTS

| | | |
|---|---|---|
| KR | 1020130016941 | 2/2013 |
| KR | 101482013 | 1/2015 |

* cited by examiner

*Primary Examiner* — Charles Rones
*Assistant Examiner* — Ryan Dare
(74) *Attorney, Agent, or Firm* — IP & T Group LLP

(57) ABSTRACT

A memory system and an operating method thereof are provided. The memory system includes a buffer memory storing a plurality of meta-slices constituting meta-data, and a memory controller marking meta-slices being updated, among the plurality of meta-slices stored in the buffer memory, as dirty meta-slices, generating journal data including update information corresponding to the dirty meta-slices, and flushing the journal data together with one of the dirty meta-slices to a non-volatile memory device.

17 Claims, 19 Drawing Sheets

| Journal Entry-1 | MS1 |
|---|---|
| Journal Entry-2 | MS2 |
| Journal Entry-3 | MS3 |

⋮

| Journal Entry-8 | MS8 |
|---|---|
| Journal Entry-9 | MS9 |
| Journal Entry-10 | MS10 |
| Journal Entry-11 | MS11 |
| Journal Entry-12 | MS12 |
| Journal Entry-13 | MS1 |
| Journal Entry-14 | MS2 |

FIG. 14

BLK 1 @ NON-VOLATILE MEMORY DEVICE

| | |
|---|---|
| JOURNAL ENTRY-1 | MS1 |
| JOURNAL ENTRY-2 | MS6 |
| JOURNAL ENTRY-3 | MS11 |
| JOURNAL ENTRY-4 | MS12 |
| META-SLICE MAP 1 | JOURNAL REPLAY CONTEXT 1 |
| JOURNAL ENTRY-5 | MS2 |
| JOURNAL ENTRY-6 | MS5 |
| JOURNAL ENTRY-7 | MS7 |
| JOURNAL ENTRY-8 | MS9 |

BLK 2 @ NON-VOLATILE MEMORY DEVICE

| | |
|---|---|
| JOURNAL ENTRY-9 | MS10 |
| JOURNAL ENTRY-10 | MS12 |
| META-SLICE MAP 2 | JOURNAL REPLAY CONTEXT 2 |
| JOURNAL ENTRY-11 | MS2 |
| JOURNAL ENTRY-12 | MS3 |
| ERASED | |
| ERASED | |
| ERASED | |
| ERASED | | ns # MEMORY SYSTEM AND OPERATING METHOD THEREOF

CROSS-REFERENCE TO RELATED APPLICATION

The present application claims priority under 35 U.S.C. § 119(a) to Korean patent application number 10-2017-0150761, filed on Nov. 13, 2017, which is incorporated herein by reference in its entirety.

BACKGROUND

1. Field of Invention

Various embodiments of the invention relate to a memory system and an operating method thereof, and more particularly, to a memory system configured to reduce the time taken to perform a journal replay operation when meta-data is rebuilt, and an operating method thereof.

2. Description of Related Art

A non-volatile memory device may include a plurality of memory blocks. Further, each of the memory blocks may include a plurality of memory cells, and an erase operation may be simultaneously performed on memory cells included in one memory block.

When a memory system receives a write command and a logical address from a host, the memory system may assign a physical address corresponding to the logical address and write data into a memory area corresponding to the physical address.

The memory system may temporarily store address mapping information in a buffer memory and flush the address mapping information temporarily stored in the buffer memory to the non-volatile memory device. In addition, the memory system may re-load the address mapping information stored in the non-volatile memory device to the buffer memory when power is on.

SUMMARY

Various embodiments are directed to a memory system configured to reduce the time taken to perform a journal replay operation by using a meta-slice map when meta-data is rebuilt, and an operating method thereof. The memory system and an operating method thereof, in accordance with various embodiments, may efficiently manage meta-data.

In accordance with an embodiment, a memory system may include a buffer memory storing a plurality of meta-slices constituting meta-data, and a memory controller marking meta-slices being updated, among the plurality of meta-slices stored in the buffer memory, as dirty meta-slices, generating journal data including update information corresponding to the dirty meta-slices, and flushing the journal data together with one of the dirty meta-slices to a non-volatile memory device.

In accordance with an embodiment, a memory system may include a non-volatile memory device to which dirty meta-slices, among a plurality of meta-slices constituting meta-data, journal entries including update information corresponding to the dirty meta-slices, and a journal replay context including index information on the dirty meta-slices are flushed, a buffer memory storing information loaded from the non-volatile memory device, and a memory controller loading the journal replay context into the buffer memory and rebuilding the journal replay context loaded into the buffer memory by reflecting information about dirty meta-slices flushed after the journal replay context is flushed, among the dirty meta-slices.

In accordance with an embodiment, a method of operating a memory system may include loading a plurality of meta-slices constituting meta-data into a buffer memory, marking meta-slices being updated, among the plurality of meta-slices, as dirty meta-slices, generating a journal entry including update information corresponding to at least one of the dirty meta-slices, searching the plurality of meta-slices loaded into the buffer memory for one of the dirty meta-slices each time one journal entry is generated and flushing the one journal entry together with a found dirty meta-slice to the non-volatile memory device, updating a meta-slice map including information on physical addresses storing dirty meta-slices flushed together with the journal entries, updating a journal replay context including index information on the dirty meta-slices flushed together with the journal entries, and flushing an updated meta-slice map and an updated journal replay context to the non-volatile memory device.

BRIEF DESCRIPTION OF THE DRAWINGS

FIGS. 11 to 16 are diagrams illustrating a meta-data management method and a meta-data flush operation in accordance with an embodiment;

DETAILED DESCRIPTION

Figure 1:
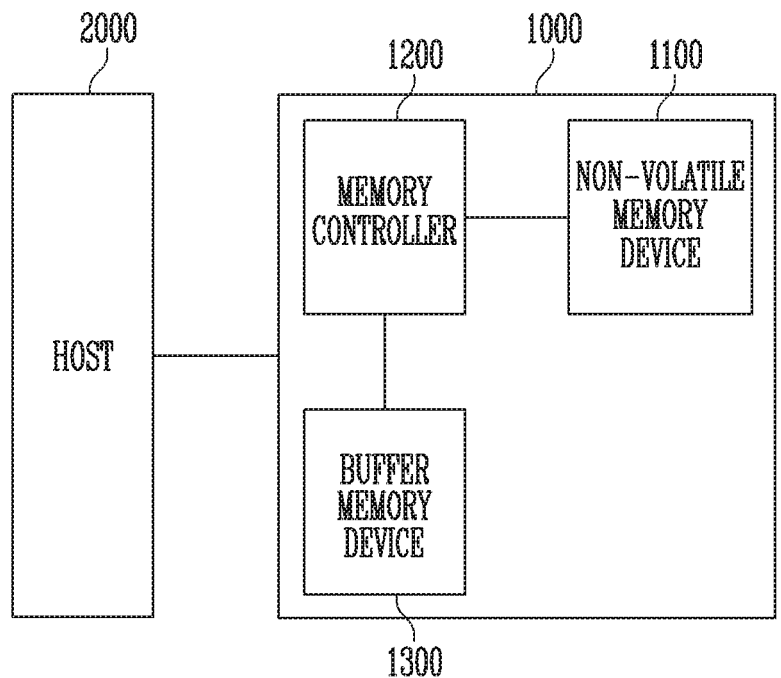
FIG. 1 is a diagram illustrating a memory system operatively coupled to a host, in accordance with an embodiment.

Hereinafter, various exemplary embodiments of the present invention will be described in detail with reference to the accompanying drawings. In the drawings, thicknesses and lengths of components may be exaggerated for convenience of illustration. In the following description, a detailed description of related, well-known functions and constitutions may be omitted for simplicity and conciseness. Like reference numerals refer to like elements throughout the specification and drawings.

It is also noted that in this specification, "connected/coupled" refers to one component not only directly coupling another component but also indirectly coupling another component through an intermediate component. In addition, throughout the specification, the term "includes" is used interchangeably with the term "comprises", hence, when it is said that an element "includes" another element (part, step, component, feature etc.), this does not exclude the presence of additional elements.

In the following description, numerous specific details are set forth in order to provide a thorough understanding of the present invention. The present invention may be practiced without some or all these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of an embodiment, unless otherwise specifically indicated.

FIG. 1 is a diagram illustrating a memory system in accordance with an embodiment.

Referring to FIG. 1, the memory system 1000 may include a non-volatile memory device 1100 that does not lose stored data even in the absence of power supply, a buffer memory device 1300 that temporarily stores data, and a memory controller 1200 that controls the non-volatile memory device 1100 and the buffer memory device 1300 in response to the control of a host 2000 which is operatively coupled to the memory system 1000.

The host 2000 may communicate with the memory system 1000 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Non-volatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM).

The memory controller 1200 may control the general operations of the memory system 1000 and control data exchange between the host 2000 and the non-volatile memory device 1100. For example, the memory controller 1200 may control the non-volatile memory device 1100 to program or read data in response to a request from the host 2000. In addition, the memory controller 1200 may store information about main memory blocks and sub-memory blocks included in the non-volatile memory device 1100, and select the non-volatile memory device 1100 to perform a program operation on a main memory block or a sub-memory block according to the amount of data loaded for the program operation. In accordance with an embodiment, the non-volatile memory device 1100 may include a flash memory.

The memory controller 1200 may control data exchange between the host and the buffer memory device 1300 or temporarily store system data for controlling the non-volatile memory device 1100 in the buffer memory device 1300. The memory buffer 1300 may serve as an operation memory, a cache memory, or a buffer memory of the memory controller 1200. The memory buffer 1300 may store codes and commands executed by the memory controller 1200. The memory buffer 1300 may store data that is processed by the memory controller 1200.

The memory controller 1200 may temporarily store data received from the host 2000 in the buffer memory device 1300 and transmit the data temporarily stored in the buffer memory device 1300 to the non-volatile memory device 1100 so that the data may be stored in the non-volatile memory device 1100. In addition, the memory controller 1200 may receive data and a logical address from the host 2000 and convert the logical address into a physical address indicating a region where the data is actually stored. In addition, the memory controller 1200 may store a logical-physical address mapping table configuring a mapping relationship between a logical address and a physical address in the buffer memory device 1300.

In accordance with an embodiment, the buffer memory device 1300 may include a Double Data Rate Synchronous Dynamic Random Access Memory (DDR SDRAM), Double Data Rate4 (DDR4) SDRAM, Low Power Double Data Rate4 (LPDDR4) SDRAM, Graphics Double Data Rate (GDDR) SDRAM, Low Power DDR (LPDDR), or Rambus Dynamic Random Access Memory (RDRAM).

In accordance with an embodiment, the memory system 1000 may not include the buffer memory device 1300.

Figure 2:
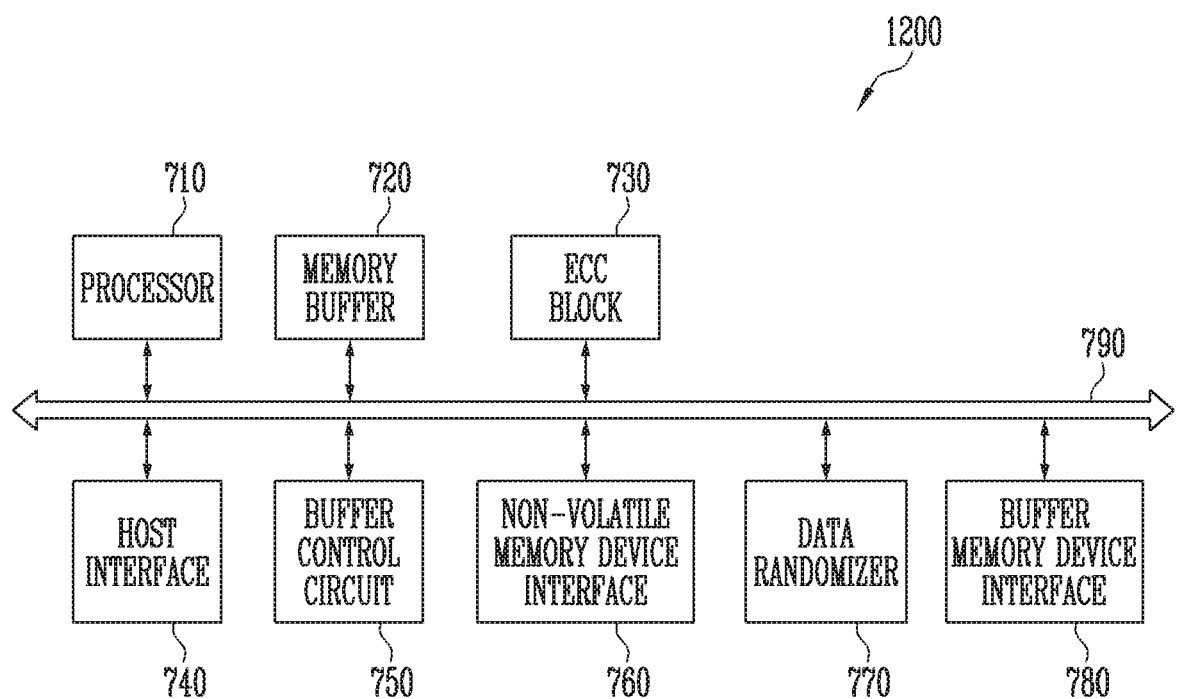
FIG. 2 is a diagram illustrating an exemplar configuration of a memory controller of the memory system shown in FIG. 1.

FIG. 2 is a diagram illustrating an exemplary configuration of the memory controller shown in FIG. 1.

Referring to FIG. 2, the memory controller 1200 may include a processor 710, a memory buffer 720, an error correction code (ECC) block 730, a host interface 740, a buffer control circuit 750, a non-volatile memory device interface 760, a data randomizer 770, a buffer memory device interface 780, and a bus 790.

The bus 790 may provide a channel between the various components of the memory controller 1200.

The processor 710 may control the overall operation of the memory controller 1200 and perform a logical operation. The processor 710 may communicate with the host 2000 through the host interface 740 and, also, with the non-volatile memory device 1100 through the non-volatile memory device interface 760. Further, the processor 710 may communicate with the buffer memory device 1300 through the buffer memory device interface 780. Further, the processor 710 may control the memory buffer 720 through the buffer control circuit 750. The processor 710 may control the operations of the memory system 1000 by using the memory buffer 720 as an operation memory, a cache memory, or a buffer memory.

The processor 710 may queue a plurality of commands input from the host 2000. This operation is called multi-queue. The processor 710 may sequentially transfer the plurality of queued commands to the non-volatile memory device 1100.

The memory buffer 720 may serve as an operation memory, a cache memory, or a buffer memory of the processor 710. The memory buffer 720 may store codes and commands executed by the memory controller 710. The memory buffer 720 may store data that is processed by the processor 710. The memory buffer 720 may include a static RAM (SRAM) or a dynamic RAM (DRAM).

The ECC block 730 may perform error correction. The ECC block 730 may perform ECC encoding through the non-volatile memory device interface 760 on the basis of data to be written to the non-volatile memory device 1100. The ECC-encoded data may be transferred to the non-volatile memory device 1100 through the non-volatile memory device interface 760. The ECC block 730 may perform ECC decoding based on data received from the non-volatile memory device 1100 through the non-volatile device interface 760. In an example, the ECC block 730 may be included in the memory interface 760 as one of the components of the memory interface 760.

The host interface 740 may be configured to communicate with the external host 2000 in response to control of the processor 710. The host 740 may communicate with the host 2000 using at least one of various communication methods such as a Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Non-volatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 750 may control the memory buffer 720 under the control of the processor 710.

The non-volatile memory device interface 760 may communicate with the non-volatile memory device 1100 under the control of the processor 710. The non-volatile memory device interface 760 may transmit/receive commands, addresses, and data to/from the non-volatile memory device 1100 through one or more channels.

In an embodiment, the memory controller 1200 may not include the memory buffer 720 and the buffer control circuit 750. For example, the processor 710 may control the operations of the memory controller 1200 using codes. The processor 710 may load codes from a non-volatile memory device (e.g., read only memory) provided in the memory controller 1200. In another example, the processor 710 may load codes from the non-volatile memory device 1100 through the non-volatile memory device interface 760.

The data randomizer 770 may randomize data or de-randomize the randomized data. The data randomizer 770 may perform data randomization on data to be written to the non-volatile memory device 1100 through the non-volatile memory device interface 760. The randomized data may be transferred to the non-volatile memory device 1100 through the non-volatile memory device interface 760. The data randomizer 770 may perform data de-randomization on the data received from the non-volatile memory device 1100 through the non-volatile memory device interface 760. In an embodiment, the data randomizer 770 may be included in the non-volatile memory device interface 760 as one of the components thereof.

For example, the bus 790 of the memory controller 1200 may be divided into a control bus and a data bus. The data bus may be configured to transmit data in the memory controller 1200, and the control bus may be configured to transmit control information such as commands or addresses in the memory controller 1200. The data bus and the control bus may be isolated from each other, and may neither interfere with nor influence each other. The data bus may be coupled to the host interface 740, the buffer control circuit 750, the ECC block 730, the non-volatile memory device interface 760, and the buffer memory device interface 780. The control bus may be coupled to the host interface 740, the processor 710, the buffer control circuit 750, the non-volatile memory device interface 760, and the buffer memory device interface 780. In accordance with an embodiment, the memory controller 1200 may not include the buffer memory device interface 780.

The buffer memory device interface 780 may communicate with the buffer memory device 1300 under the control of the processor 710. The buffer memory device interface 780 may transmit/receive commands, addresses, and data to/from the buffer memory device 1300 through a channel.

The memory system 1000 may receive a write command, write data, and a logical address from the host 2000. The memory system 1000 may allocate a physical storage space of the non-volatile memory device 1100 in which the write data is stored, i.e., a memory block or a page in response to the write command. In other words, the memory system 1000 may map a physical address corresponding to the logical address in response to the write command. The physical address may correspond to the physical storage space of the non-volatile memory device 1100 in which the write data received from the host 2000 is to be stored.

The memory system 1000 may store the above-described mapping information between the logical address and the physical address, i.e., the logical-physical address mapping information in a memory block of the non-volatile memory device 1100. The memory block storing the logical-physical address mapping information may be called a system block.

When the memory system 1000 is booted, the logical-physical address mapping information stored in the non-volatile memory device 1100 may be loaded to the buffer memory device 1300 or the memory buffer 720. In addition, the memory system 1000 may read the logical-physical address mapping information from the non-volatile memory device 1100 and store this information in the buffer memory device 1300 or the memory buffer 720 to check the logical-physical address mapping information stored in the non-volatile memory device 1100.

In another example, when the memory system 1000 receives the write command, the write data, and the logical address from the host 2000, the memory system 1000 may allocate a physical storage space of the non-volatile memory device 1100 in which the write data is stored in response to the write command. In other words, the memory system 1000 may map a physical address corresponding to the logical address in response to the write command and may update the buffer memory device 1300 or the memory buffer 720 with newly generated mapping information between the logical address and the physical address, i.e., newly generated logical-physical address mapping information.

However, there may be a difference between the logical-physical address mapping information stored in the non-volatile memory device 1100 and the logical-physical address mapping information stored in the buffer memory device 1300 or the memory buffer 720. To compensate for the above difference, the memory system 1000 may flush the logical-physical address mapping information stored in the buffer memory device 1300 or the memory buffer 720 to the non-volatile memory device 1100. During the above flush operation, the logical-physical address mapping information stored in the non-volatile memory device 1100 may be changed on the basis of the logical-physical address mapping information stored in the buffer memory device 1300 or the memory buffer 720 so that the logical-physical address mapping information stored in the non-volatile memory device 1100 and the logical-physical address mapping information stored in the buffer memory device 1300 or the memory buffer 720 may coincide with each other.

The memory system 1000 may receive a read command and a logical address from the host 2000. The memory system 1000 may check a physical address corresponding to the logical address from the logical-physical address mapping information stored in the non-volatile memory device, read data stored in a memory area corresponding to the physical address, and output the read data to the host 2000 in response to the read command.

Figure 3:
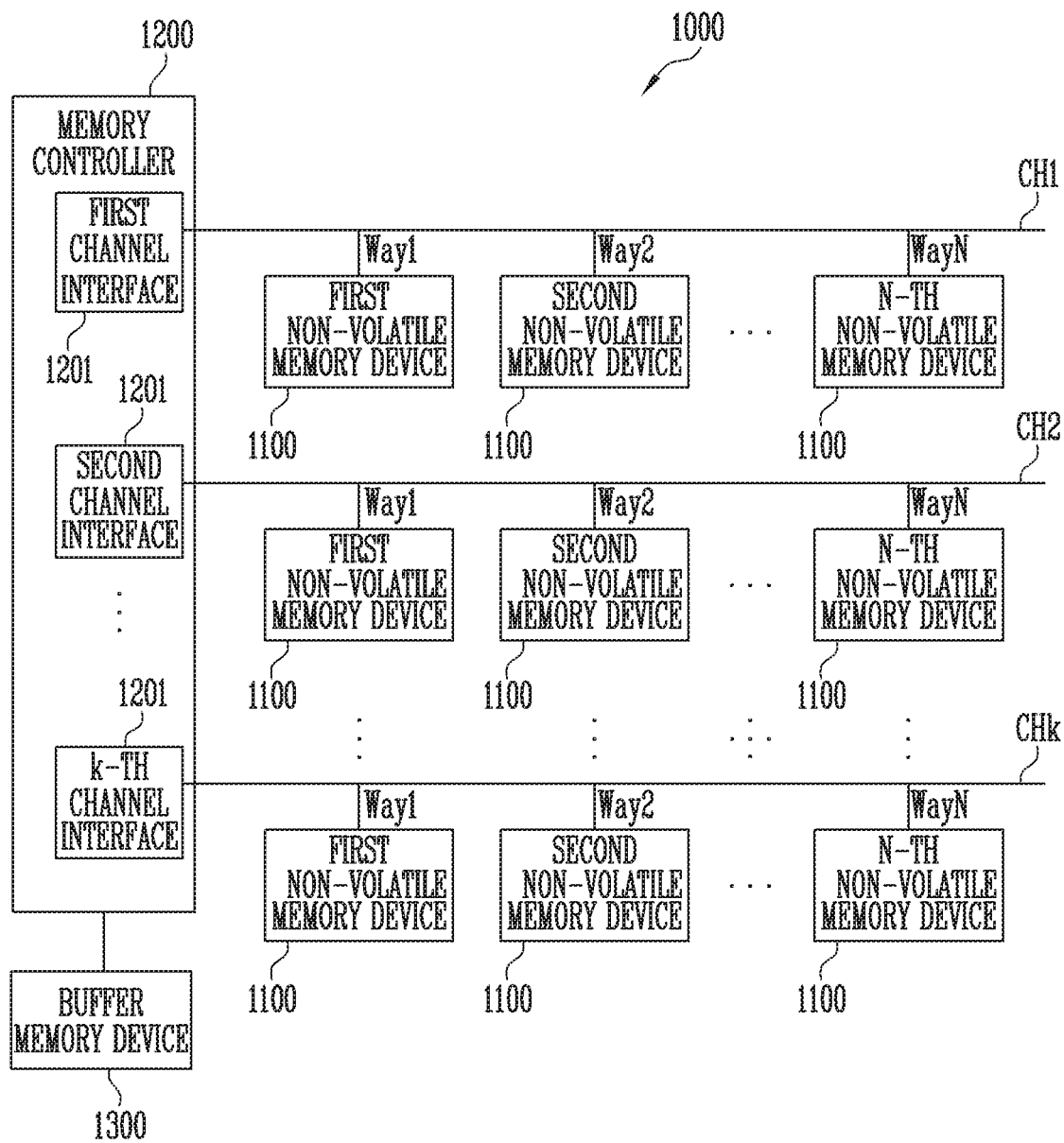
FIG. 3 is a diagram illustrating a memory system in accordance with an embodiment.

FIG. 3 is a diagram illustrating the memory system in accordance with an embodiment. FIG. 3 illustrates the memory system 1000 that includes the memory controller 1200 and a plurality of memory devices 1100 coupled to the memory controller 1200 through a plurality of channels CH1 to CHk.

Referring to FIG. 3, the memory controller 1200 may communicate with the plurality of non-volatile memory devices 1100 through the plurality of channels CH1 to CHk. The memory controller 1200 may include a plurality of channel interfaces 1201, and each of the channels CH1 to CHk may be coupled to each of the channel interfaces 1201. For example, a first channel CH1 may be coupled to the first channel interface 1201, a second channel CH2 may be coupled to the second channel interface 1201, and a k-th channel CHk may be coupled to the k-th channel interface 1201. Each of the channels CH1 to CHk may be coupled to one or more non-volatile memory devices 1100. In addition, the non-volatile memory devices 1100 coupled to different channels may operate independently of each other. For example, the non-volatile memory device 1100 coupled to the first channel CH1 and the non-volatile memory device 1100 coupled to the second channel CH2 may operate independently of each other. More specifically, the memory controller 1200 may exchange data or commands with the non-volatile memory device 1100, coupled to the second channel CH2, through the second channel CH2 in parallel to the first channel CH1 while exchanging data or commands with the non-volatile memory device 1100, coupled to the first channel CH1, through the first channel CH1.

Each of the channels CH1 to CHk may be coupled to a plurality of non-volatile memory devices 1100. The plurality of non-volatile memory devices 1100 coupled to each of the channels may constitute different ways, respectively. For example, N non-volatile memory devices 1100 may be coupled to a single channel, and the respective non-volatile memory devices 1100 may configure different ways. That is, the first to N-th memory devices 1100 may be coupled to the first channel CH1. The first non-volatile memory device 1100 may configure a first way Way1, the second non-volatile memory device 1100 may configure a second way Way2, and the N-th non-volatile memory device 1100 may configure an N-th way WayN. However, contrary to the configuration of FIG. 2, in an embodiment (not shown) two or more non-volatile memory devices 1100 may constitute a single way.

Since the first to N-th non-volatile memory devices 1100 coupled to the first channel CH1 share the first channel CH1, these memory devices may exchange data or commands with the memory controller 1200 sequentially, but not simultaneously, i.e., in parallel. For example, when the memory controller 1200 transmits data to the first non-volatile memory device 1100 configuring the first way Way1 of the first channel CH1 through the first channel CH, the second to N-th non-volatile memory devices 1100 configuring the second to N-th ways Way2 to WayN of the first channel CH1 may not exchange data or commands with the memory controller 1200 through the first channel CH1. Therefore, while one of the first to N-th non-volatile memory devices 1100 sharing the first channel CH1 is occupying the first channel CH1, the other non-volatile memory devices 1100 coupled to the first channel CH1 may not use the first channel CH1.

The first non-volatile memory device 1100 configuring the first way Way1 of the first channel CH1 and the first non-volatile memory device 1100 configuring the first way Way1 of the second channel CH2 may communicate with the memory controller 1200, independently of each other. In other words, the memory controller 1200 may exchange data with the first non-volatile memory device 1100 configuring the first way Way1 of the second channel CH2 through the second channel CH2 and the second channel interface 1201 at the same time as the memory controller 1200 exchanges data with the first non-volatile memory device 1100 configuring the first way Way1 of the first channel CH1 through the first channel CH1 and the first channel interface 1201.

Figure 4:
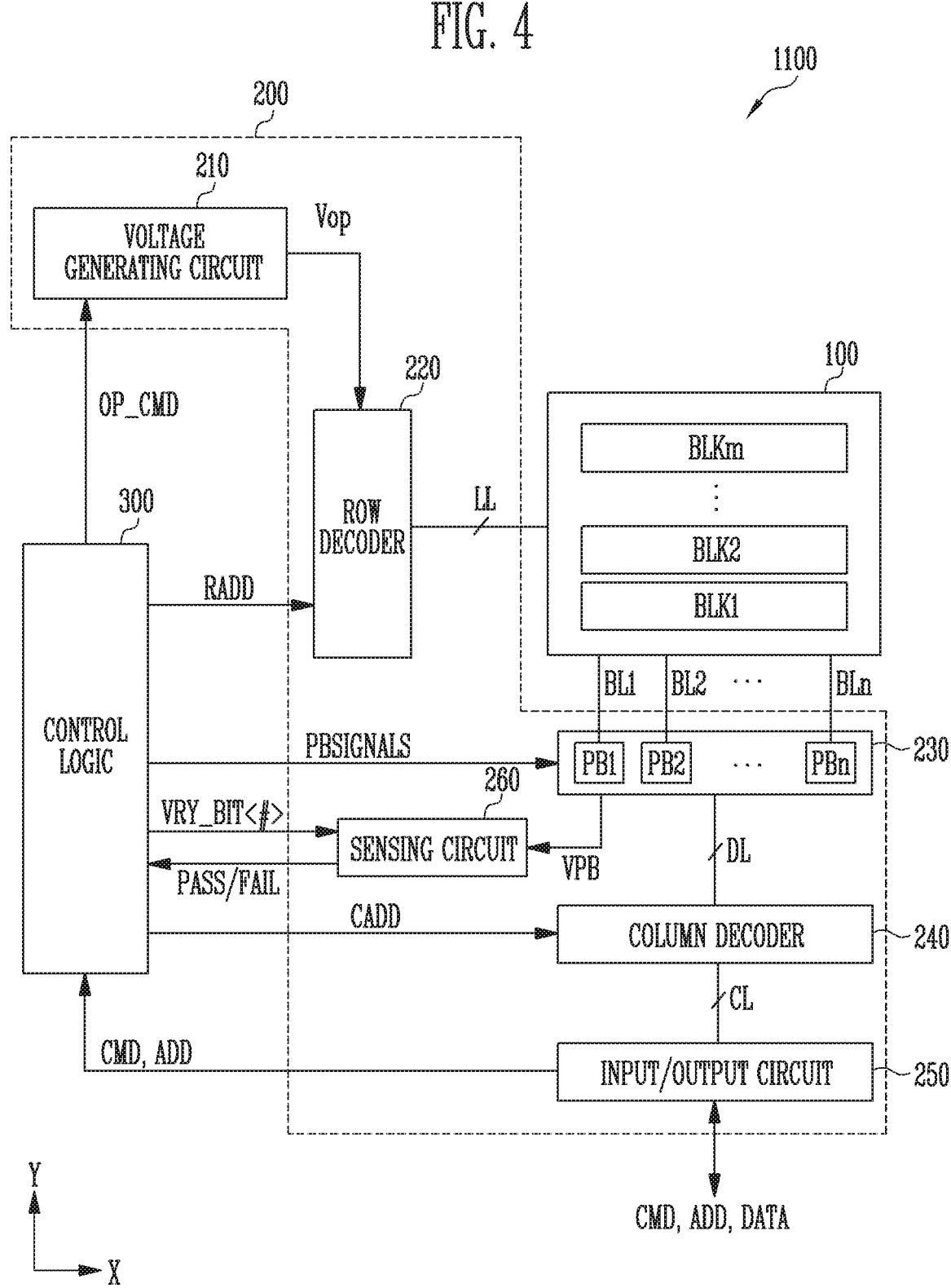
FIG. 4 is a diagram illustrating an exemplary configuration of a non-volatile memory device of the memory system shown in FIG. 1.

FIG. 4 is a diagram illustrating an exemplary configuration of the non-volatile memory device shown in FIG. 1.

Referring to FIG. 4, the non-volatile memory device 1100 may include a memory cell array 100 for storing data therein. The non-volatile memory device 1100 may include peripheral circuits 200 configured to perform at least one of a program operation to store data in the memory cell array 100, a read operation to output the stored data, and an erase operation to erase the stored data. The non-volatile memory device 1100 may include a control logic 300 that controls the peripheral circuits 200 in response to control of the memory controller 1200 shown in FIG. 1.

The memory cell array 100 may include a plurality of memory blocks BLK1 to BLKm, where m is a positive integer. Local lines LL and bit lines BL1 to BLn may be coupled to the memory blocks BLK1 to BLKm, where n is a positive integer. For example, the local lines LL may include a first select line, a second select line, and a plurality of word lines arranged between the first and second select lines. In addition, the local lines LL may include dummy lines arranged between the first select line and the word lines and between the second select line and the word lines. The first select line may be a source select line, and the second select line may be a drain select line. For example, the local lines LL may include word lines, drain and source select lines, and source lines. For example, the local lines LL may further include dummy lines. For example, the local lines LL may further include pipe lines. Dedicated local lines LL may be coupled to each of the memory blocks BLK1 to BLKm, whereas, the bit lines BL1 to BLn may be coupled in common to the memory blocks BLK1 to BLKm. The memory blocks BLK1 to BLKm may have a two-dimensional (2D) or three-dimensional (3D) structure. For example, in the 2D structured memory blocks, memory cells may be arranged in parallel with a substrate. For example, in the 3D memory blocks, memory cells may be stacked in a vertical direction to the substrate.

The peripheral circuits 200 may be configured to perform at least one of a program, read and erase operations on the selected memory block among the memory blocks BLK1 to BLKm in response to the control of the control logic 300. For example, the control logic 300 may control the peripheral circuits 200 to supply a verify voltage and pass voltages to the first select line, the second select line, and the word lines, selectively discharge the first select line, the second select line and the word lines, and verify memory cells coupled to a selected word line, among the word lines. For example, the peripheral circuits 200 may include a voltage generating circuit 210, a row decoder 220, a page buffer group 230, a column decoder 240, an input/output circuit 250, and a sensing circuit 260.

The voltage generating circuit 210 may generate various operating voltages Vop used to perform at least one of a program, read and erase operations in response to an operation signal OP_CMD. In addition, the voltage generating circuit 210 may selectively discharge the local lines LL in response to the operation signal OP_CMD. For example, the control logic 300 may control the voltage generating circuit 210 to generate at least one of a program voltage, a verify voltage, pass voltages, a turn on voltage, a read voltage, an erase voltage, and a source line voltage.

The row decoder 220 may transfer the operating voltages Vop to the local lines LL coupled to the selected memory block in response to a row address RADD.

The page buffer group 230 may include a plurality of page buffers PB1 to PBn each coupled to the bit lines BL1 to BLn. Each of the page buffers PB1 to PBn may be coupled to a corresponding bit line among the bit lines BL1 to BLn. The page buffers PB1 to PBn may operate in response to page buffer control signals PBSIGNALS. For example, in operation, the page buffers PB1 to PBn may temporarily store data received through the bit lines BL1 to BLn, or sense voltages or currents in the bit lines BL1 to BLn during a read or verify operation.

The column decoder 240 may transfer data between the input/output circuit 250 and the page buffer group 230 in response to a column address CADD. For example, the column decoder 240 may exchange data with the page buffers PB1 to PBn through data lines DL, or may exchange data with the input/output circuit 250 through column lines CL.

The input/output circuit 250 may transfer the command CMD and the address ADD received from the memory controller 1200 shown in FIG. 1 to the control logic 300, or may exchange data with the column decoder 240.

The sensing circuit 260 may generate a reference current in response to an allowable bit VRY_BIT<#> and compare a sensing voltage VPB received from the page buffer group 230 with a reference voltage generated by the reference current to output a pass signal PASS or a fail signal FAIL during a read operation or a verify operation.

The control logic 300 may output the operation signal OP_CMD, the row address RADD, the column address CADD, the page buffer control signals PBSIGNALS and the allowable bit VRY_BIT<#> to control the peripheral circuits 200 in response to the command CMD and the address ADD. In addition, the control logic 300 may determine whether the verify operation passes or fails in response to the pass or fail signal PASS or FAIL.

In association with the operations of the non-volatile memory device 1100, each memory block may be the unit of an erase operation. In other words, a plurality of memory cells included in one memory block may be simultaneously erased or may not be selectively erased.

Figure 5:
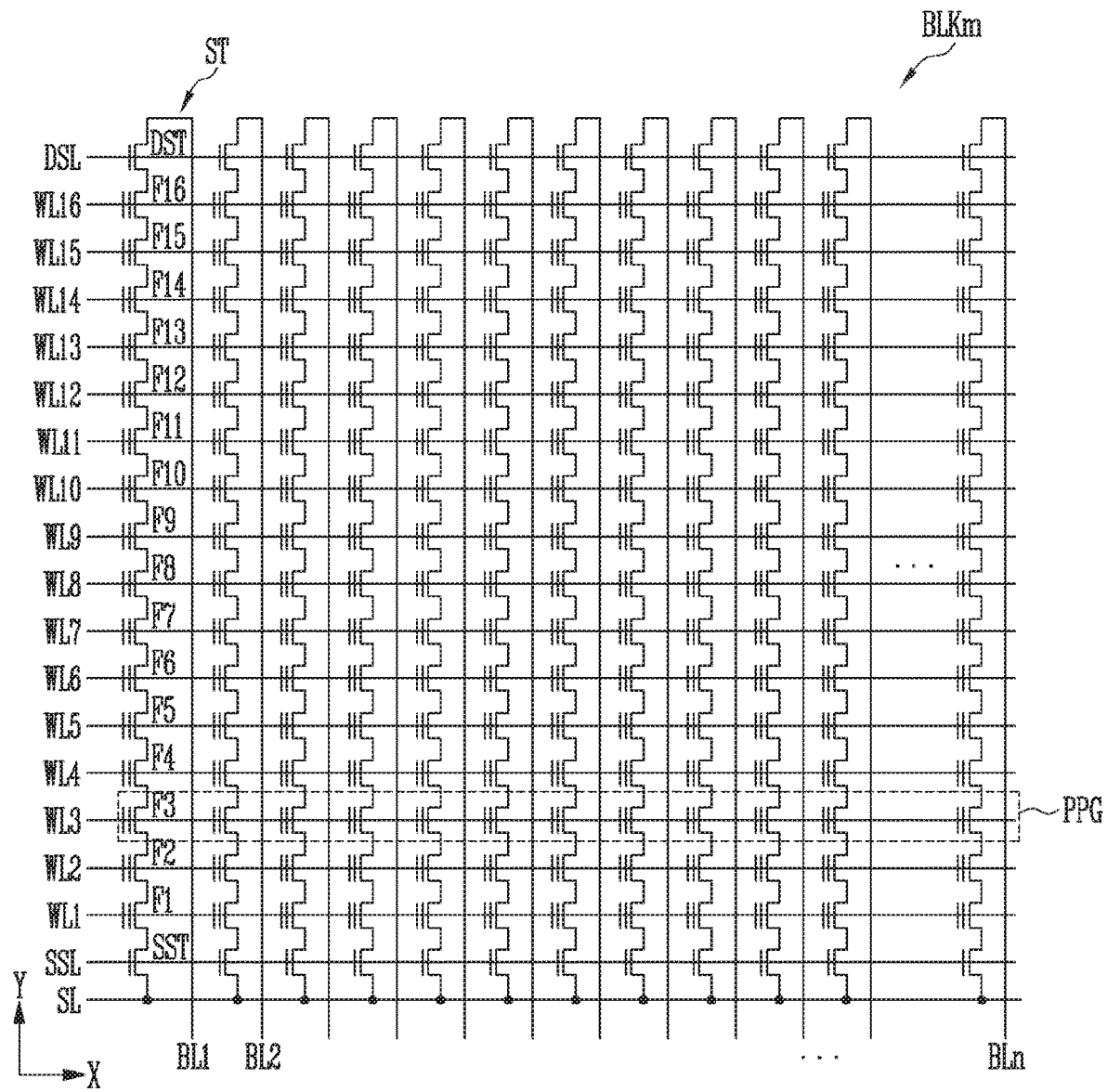
FIG. 5 is a circuit diagram illustrating an example of one of a plurality memory blocks of the memory device shown in FIG. 4.

FIG. 5 is a diagram illustrating one of the memory blocks shown in FIG. 4.

Referring to FIG. 5, the memory block BLKm may be configured such that a plurality of word lines, which are arranged in parallel with each other, may be coupled between a first select line and a second select line. The first select line may be a source select line SSL and the second select line may be a drain select line DSL. More specifically, the memory block BLKm may include a plurality of strings ST coupled between the bit lines BL1 to BLn and a source line SL. Each of the bit lines BL1 to BLn may be coupled to each of the strings ST, and the source line SL may be commonly coupled to the strings ST. Since the strings ST may have the same configuration, the string ST coupled to the first bit line BL1 will be described in detail as an example.

The string ST may include a source selection transistor SST, a plurality of memory cells F1 to F16 and a drain selection transistor DST coupled in series between the source line SL and the first bit line BL1. A single string ST may include at least one source select transistor SST and at least one drain select transistors DST, and may include more memory cells than the memory cells F1 to F16 as shown in FIG. 5.

A source of the source selection transistor SST may be coupled to the source line SL, and a drain of the drain selection transistor DST may be coupled to the first bit line BL1. The memory cells F1 to F16 may be coupled in series between the source selection transistor SST and the drain selection transistor DST. Gates of the source selection transistors SST included in different strings ST may be coupled to the source select line SSL, gates of the drain selection transistors DST may be coupled to the drain select line DSL, and gates of the memory cells F1 to F16 may be coupled to a plurality of word lines WL1 to WL16. A group of memory cells coupled to the same word line, among memory cells included in different strings ST, may be referred to as a physical page PPG. Therefore, the memory block BLKm may include as many physical pages PPG as the number of word lines WL1 to WL16.

A single memory cell may store one bit of data. This memory cell is generally called a single level cell (SLC). A single physical page PPG of SLCs may store data corresponding to a single logical page LPG. Data corresponding to the single logical page LPG may include as many data bits as the number of cells included in the single physical page PPG. In addition, a single memory cell MC may store two or more bits of data. This cell is typically referred to as a "multi-level cell (MLC)." A single physical page PPG of MLCs may store data corresponding to two or more logical pages LPG.

When a memory cell stores 2-bit data, the single physical page PPG may include two pages PG. One physical page PPG may store data of one logical page LPG. One memory cell may include one of a plurality of threshold voltages depending on data, and a plurality of pages PG included in one physical page PPG may be represented as differences in threshold voltage.

A plurality of memory cells included in one physical page PPG may be simultaneously programmed. In other words, the non-volatile memory device 1100 may perform a program operation on each physical page PPG. A plurality of memory cells included in a single memory block may be simultaneously erased. In other words, the non-volatile memory device 1100 may perform an erase operation on each memory block. For example, in order to update a portion of data stored in one memory block, the entire data stored in the memory block may be read, the portion of the data to be updated may be changed, and another memory block may be programmed with the entire data.

Figure 6:
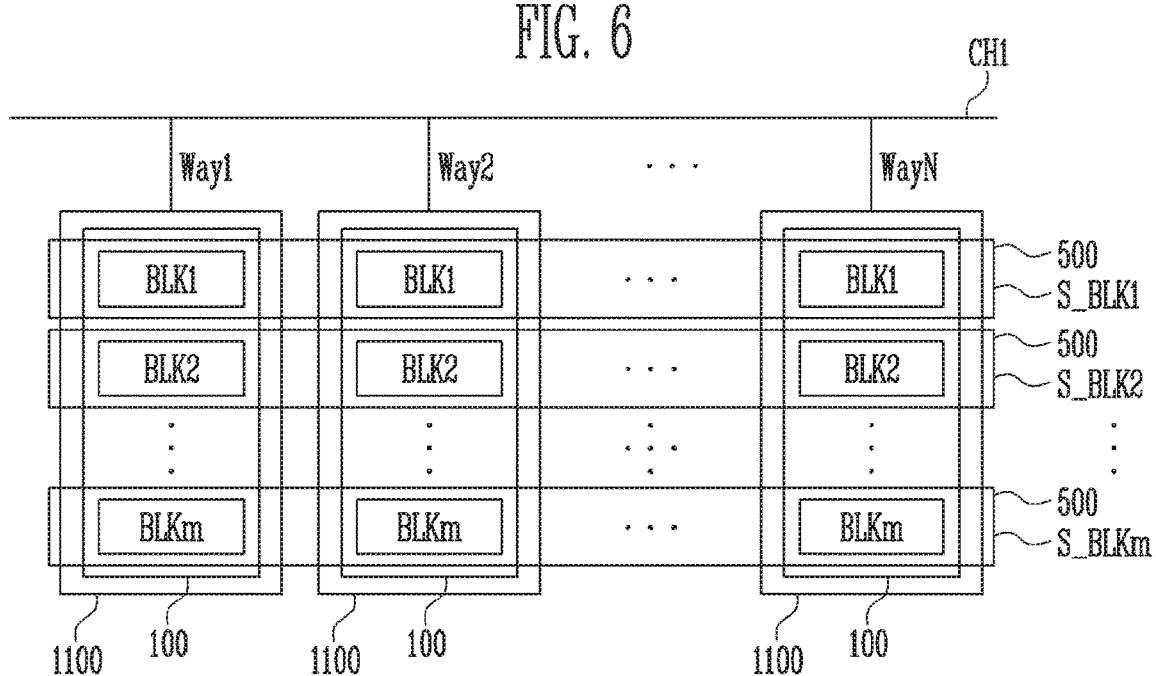
FIG. 6 is a diagram illustrating a super block.

FIG. 6 is a diagram illustrating a super block.

Referring to FIG. 6, each of the plurality of ways Way1 to WayN constituting the first channel CH1 may include one or more non-volatile memory devices 1100. As described above, one non-volatile memory device 1100 may include the memory cell array 100 for storing data, and the memory cell array 100 may include the plurality of memory blocks BLK1 to BLKm. An erase operation may be performed on individual memory blocks BLK1 to BLKm independently of each other, and the erase operation may be simultaneously performed on a plurality of memory cells included in one memory block.

A super block 500 may include a group of memory blocks selected from among respective non-volatile memory devices 1100 configuring different ways. In other words, a first super block S_BLK1 (500) may include the first memory block BLK1 included in a first non-volatile memory device 1100 configuring the first way Way1, the first memory block BLK1 included in a second non-volatile memory device 1100 configuring the second way Way2 to the first memory block BLK1 included in an N-th non-volatile memory device 1100 configuring the N-th way WayN. In addition, a second super block S_BLK2 (500) may include a second memory block BLK2 included in the first non-volatile memory device 1100 configuring the first way Way1, the second memory block BLK2 included in the second non-volatile memory device 1100 configuring the second way Way2 to the second memory block BLK2 included in the N-th non-volatile memory device 1100 configuring the N-th way WayN. In the same manner, an m-th super block S_BLKm (500) may include the m-th memory block BLKm included in the first non-volatile memory device 1100 configuring the first way Way1, the m-th memory block BLKm included in the second non-volatile memory device 1100 configuring the second way Way2 to the m-th memory block BLKm included in the N-th non-volatile memory device 1100 configuring the N-th way WayN.

A plurality of memory blocks included in one super block 500 may be physically different from each other but may logically function as a single memory block. In other words, the plurality of memory blocks included in one super block 500 may be simultaneously programmed or erased. The memory system 1000 may perform a program or an erase operation on each super block, thus improving the performance of the program or erase operation. In addition, the memory system 1000 may perform an operation, such as garbage collection or wear leveling, on each super block to efficiently manage a plurality of memory blocks.

Figure 7:
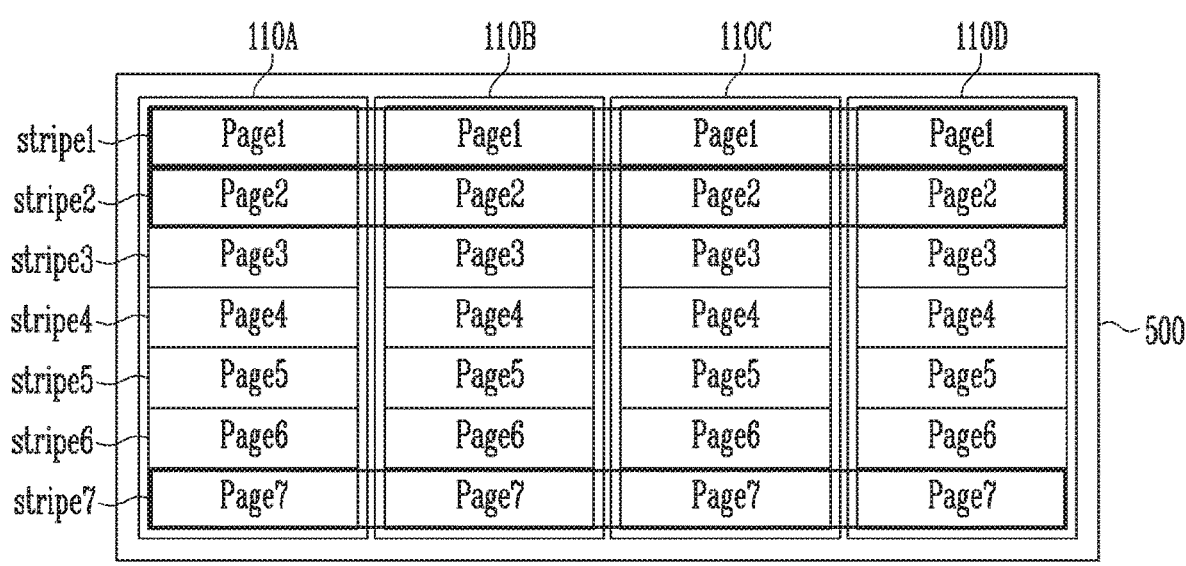
FIG. 7 is a diagram illustrating a stripe.

FIG. 7 is a diagram illustrating a stripe.

Referring to FIG. 7, one super block 500 may include a plurality of memory blocks 110A to 110D. The memory blocks 110A to 110D may be included in different non-volatile memory devices 1100, which may configure different ways from each other. In addition, each of the memory blocks 110A to 110D may include a plurality of pages Page1 to Page7.

The memory block 500 may include a plurality of stripes, e.g., stripe1 to stripe7. The memory system 1000 may perform a program operation on the first pages Page1 included in the first, second, third, and fourth memory blocks 110A, 110B, 110C, and 110D in parallel. A group of the first pages Page1 included in the first, second, third, and fourth memory blocks 110A, 110B, 110C, and 110D may be referred to as a first stripe stripe1. In other words, a program operation may be performed on a plurality of pages included in one stripe in parallel. In other words, the memory system 1000 may manage and operate the super block 500 logically as one memory block. In addition, the memory system 1000 may manage and operate one stripe logically as one page. The memory system 1000 may operate with more efficiency through the management and operation of the super blocks and the stripes.

Figures 8, 9:
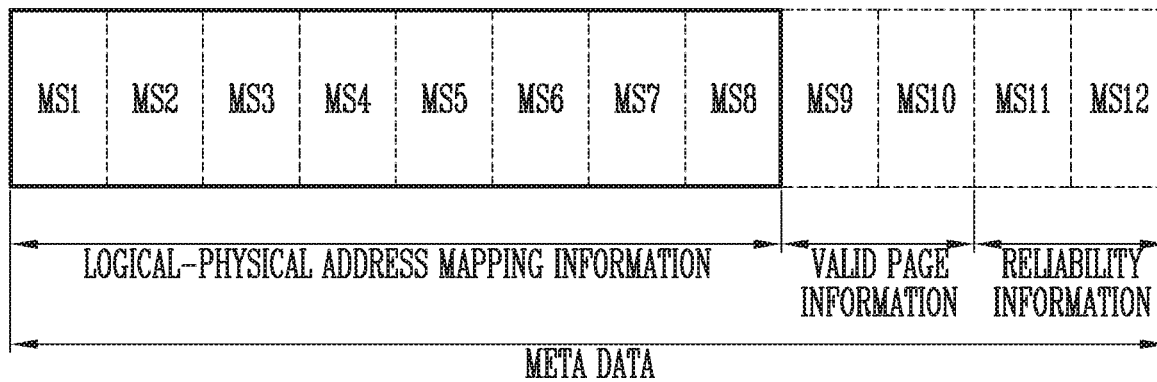
FIG. 8 is a diagram illustrating a meta-data management method in accordance with an embodiment.
FIG. 9 is a diagram illustrating a meta-data flush operation in accordance with an embodiment.

FIG. 8 is a diagram illustrating a meta-data management method in accordance with an embodiment.

Referring to FIG. 8, meta-data may include at least one of logical-physical address mapping information, valid page information, and reliability information.

The logical-physical address mapping information may be mapping information between a logical address received from the host 2000 and a physical address for a memory space in which data corresponding to the logical address is to be stored in the non-volatile memory device 1100 as described above. In addition, the logical-physical address mapping information may be mapping information between a logical address and a physical address for a memory space in which data corresponding to the logical address is stored in the non-volatile memory device 1100 as described above.

In another example, the meta-data may include logical-virtual address mapping information instead of the logical-physical address mapping information. The memory controller 1200 may receive a write command, write data, and a logical address from the host 2000. The memory controller 1200 may assign a physical storage space of the non-volatile memory device 1100 in which the write data is to be stored, i.e., the memory block or a page in response to the write command. The address for the assigned physical storage space of the non-volatile memory device 1100 may be referred to as a virtual address. In other words, the virtual address may correspond to the physical storage space of the non-volatile memory device 1100 in which the write data received from the host 2000 is to be stored.

Subsequently, the memory controller 1200 may program the physical storage space of the non-volatile memory device 1100 corresponding to the virtual address with the write data input from the host 2000. When the program operation on the write data is successfully completed, the virtual address may be the same as the final physical address.

In another example, when the physical storage space of the non-volatile memory device 1100 corresponding to the virtual address is defective, the program operation on the write data may fail. The memory controller 1200 may assign another storage space in the non-volatile memory device 1100 for storing the write data, and program the assigned storage space with the write data. However, in this example, the initially assigned virtual address may be different from the final physical address of the write data. As a result, when the program operation on the write data is successfully completed, the virtual address may be changed into the final physical address.

The meta-data may include the valid page information. The valid page information may be information about a page or a stripe that stores valid data, among a plurality of pages in a memory block, or among a plurality of stripes in a super block. The memory controller 1200 may use the valid page information during a garbage collection operation. In other words, the memory controller 1200 may read the valid page information stored in the non-volatile memory device 1100 and load the valid page information to the buffer memory device 1300 or the memory buffer 720 during the garbage collection operation. Subsequently, the memory controller 1200 may perform a garbage collection operation based on the valid page information loaded to the buffer memory device 1300 or the memory buffer 720, and may update the valid page information stored in the buffer memory device 1300 or the memory buffer 720 after the garbage collection operation is completed. In addition, the memory controller 1200 may renew the valid page information stored in the non-volatile memory device 1100 on the basis of the updated valid page information. The buffer memory device 1300 or the memory buffer 720 may be collectively referred to as a "buffer memory."

The meta-data may include the reliability information. The reliability information may include erase cycle count information and read count information on the memory block or the super block 500. The memory controller 1200 may control a read reclaim operation or a wear leveling operation on the basis of the above-described reliability information.

Threshold voltages of memory cells may be increased by a read operation. As the number of times a read operation performed increases, the threshold voltages of the memory cells may be increased. As a result, an error rate of data may be increased during the read operation. For example, when an error level of the data stored in the memory block is excessively increased, an error correction operation on the data may fail. The memory controller 1200 may copy-program the data stored in the memory block before the error correction operation fails into another memory block. This operation may be called a read reclaim operation. In other words, during the read reclaim operation, the data stored in a memory block may be copied-programmed into another memory block when an error level of the data stored in the memory block is greater than or equal to a predetermined level.

The memory controller 1200 may manage the plurality of memory blocks or the super blocks 500 to have similar reliability levels. This operation may be called a wear leveling operation. The reliability levels of the memory blocks or the super blocks 500 may be lowered as program-erase operations are frequently performed. In other words, during the wear leveling operation, a program-erase count of the memory blocks or the super blocks 500 may be managed so that the plurality of memory blocks or the super blocks 500 may have similar reliability levels.

The memory controller 1200 may perform a wear leveling operation on the basis of reliability information stored in the buffer memory device 1300 or the memory buffer 720, and may update the reliability information stored in the buffer memory device 1300 or the memory buffer 720 after the wear leveling operation. In addition, the memory controller 1200 may renew the reliability information stored in the non-volatile memory device 1100 on the basis of the updated reliability information.

The memory controller 1200 may manage the meta-data by splitting the meta-data into a plurality of meta-slices MS1 to MS12. Each of the meta-slices MS1 to MS8 in the logical-physical address mapping information may be information corresponding to at least one of the plurality of stripes in the super block 500. In another example, each of the meta-slices MS1 to MS8 in the logical-physical address mapping information may be information corresponding to at least one of the plurality of pages in the memory block.

The size of the meta-slice or the number of meta-slices in the meta-data may be determined by the processor 710. For example, the meta-data may be divided into a plurality of meta-slices on the basis of a logical address.

FIG. 9 is a diagram illustrating a meta-data flush operation in accordance with an embodiment.

Referring to FIG. 9, during a booting operation, the memory controller 1200 may load the logical-physical address mapping information stored in the non-volatile memory device 1100 to the buffer memory device 1300 or the memory buffer 720. In addition, the memory controller 1200 may read the logical-physical address mapping information from the non-volatile memory device 1100 and store this information in the buffer memory device 1300 or the memory buffer 720 so as to check the logical-physical address mapping information stored in the non-volatile memory device 1100.

The memory controller 1200 may receive a write command, write data, and a logical address from the host 2000. The memory controller 1200 may assign a physical storage space of the non-volatile memory device 1100 in which the write data is to be stored, i.e., the memory block or a page in response to the write command. In other words, the memory controller 1200 may map a physical address corresponding to the logical address in response to the write command. The physical address may correspond to the physical storage space of the non-volatile memory device 1100 in which the write data received from the host 2000 is to be stored.

The memory controller 1200 may map a physical address corresponding to the logical address in response to the write command, and may update the existing logical-physical address mapping information stored in the buffer memory device 1300 or the memory buffer 720 with newly generated mapping information between the logical address and the physical address, i.e., logical-physical address mapping information.

In this case, there may be a difference between the logical-physical address mapping information stored in the non-volatile memory device 1100 and the logical-physical address mapping information stored in the buffer memory device 1300 or the memory buffer 720. The memory controller 1200 may flush the logical-physical address mapping information stored in the buffer memory device 1300 or the memory buffer 720 to the non-volatile memory device 1100, so that the logical-physical address mapping information stored in the non-volatile memory device 1100 may be the same as the logical-physical address mapping information stored in the buffer memory device 1300 or the memory buffer 720. The memory controller 1200 may perform the above-described flush operation to make the logical-physical address mapping information stored in the buffer memory device 1300 or the memory buffer 720 coincide with the logical-physical address mapping information stored in the non-volatile memory device 1100.

The memory controller 1200 may perform a flush operation in a unit of a meta-slice, and during the flush operation, the memory controller 1200 may store journal data as well as the meta-slice in the non-volatile memory device 1100. The journal data may be history information about updates of meta-data. In other words, meta-data before or after updating may be derived through the journal data. The above-described meta-data flush operation may be performed when the journal data is filled up.

The journal data may be stored in a space of the buffer memory device 1300 or the memory buffer 720. When the journal data is filled up, it may mean that the space assigned for storing the journal data in the buffer memory device 1300 or the memory buffer 720 may be filled up. After the journal data stored in the buffer memory device 1300 or the memory buffer 720 is flushed to the non-volatile memory device 1100, the journal data stored in the buffer memory device 1300 or the memory buffer 720 may be erased. In other words, new journal data may be stored in the journal data storage space of the buffer memory device 1300 or the memory buffer 720 after the flush operation.

For example, when the journal data is filled up, the memory controller 1200 may flush the first meta-slice MS1 stored in the buffer memory device 1300 or the memory buffer 720 as well as the journal data to the non-volatile memory device 1100. This full journal data may be referred to as a "journal entry-1". The memory controller 1200 may flush the first meta-slice MS1 and the journal entry-1 stored in the buffer memory device 1300 or the memory buffer 720 to the non-volatile memory device 1100. Subsequently, new journal data may be stored in the journal data storage space of the buffer memory device 1300 or the memory buffer 720.

Subsequently, when the journal data is filled up again, i.e., when a journal entry-2 is generated, the memory controller 1200 may flush the journal entry-2 and a second meta-slice MS2 stored in the buffer memory device 1300 or the memory buffer 720 to the non-volatile memory device 1100. As described above, the memory controller 1200 may flush a next meta-slice subsequent to the previously flushed meta-slice along with the journal data to the non-volatile memory device 1100 when the journal data is filled up.

The memory controller 1200 may sequentially flush the meta-slices MS3 to MS8 of the logical-physical address mapping information along with journal entry-3 to journal entry-8 in the above-described manner.

As described above, the plurality of journal entries flushed to the non-volatile memory device 1100 may be collectively referred to as "journal data."

Subsequently, the memory controller 1200 may sequentially flush ninth and tenth meta-slices MS9 and MS10 included in the valid page information and eleventh and twelfth meta-slices MS11 and MS12 included in the reliability information along with a journal entry-9 to a journal entry-12 to the non-volatile memory device 1100.

After the memory controller 1200 flushes the last meta-slice of the plurality of meta-slices forming the meta-data, i.e., the twelfth meta-slice MS12, if the journal data is filled up again, the memory controller 1200 may flush the corresponding journal data, i.e., a journal entry-13 and the first meta-slice, i.e., the first meta-slice MS1 to the non-volatile memory device 1100.

By the above-described operation, the memory controller 1200 may flush the meta-data and the journal data stored in the buffer memory device 1300 or the memory buffer 720 to the non-volatile memory device 1100.

The size of the meta-slice in the meta-data may be determined by the processor 710. For example, meta-data may be divided into a plurality of meta-slices on the basis of a logical address.

When power is supplied to the memory system 1000, the memory controller 1200 may generate a command and an address for sequentially reading the meta-data divided into the plurality of meta-slices stored in the non-volatile memory device 1100 and storing the read meta-data in the buffer memory device 1300 or the memory buffer 720. The memory controller 1200 may control the memory system 1000 to update the meta-data stored in the buffer memory device 1300 or the memory buffer 720 depending on an operation which causes changes in the meta-data, and may generate and store a journal entry corresponding to the changes in the meta-data in the buffer memory device 1300 or the memory buffer 720.

The journal entry may include information necessary to restore the changes in the meta-data. For example, the journal entry may include information about a type of the operation which causes the changes in the meta-data, and data for restoring the changes in the meta-data. The information about the type of the operation which causes the changes in the meta-data may include information defining types of all operations which may change the meta-data, for example, a write operation, an operation of allocating a memory block, and an operation of copying data stored in a page. In addition, the data for restoring the changes in the meta-data may include a logical address, a previous physical address, and a new physical address.

Figure 10:
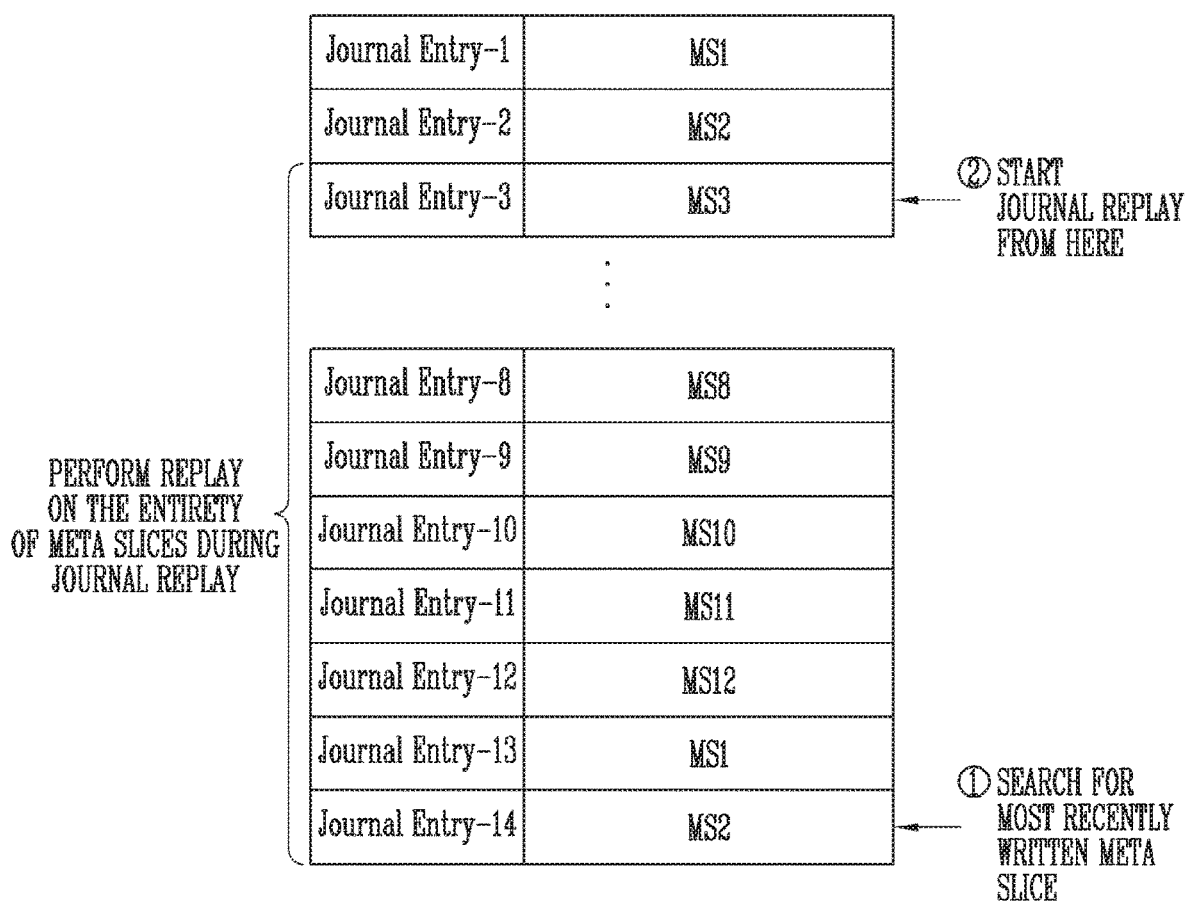
FIG. 10 is a diagram illustrating a journal replay operation in accordance with an embodiment.

FIG. 10 is a diagram illustrating a journal replay operation in accordance with an embodiment.

The memory system 1000 may read the meta-data stored in the non-volatile memory device 1100 and rebuild the read meta-data in the buffer memory device 1300 or the memory buffer 720 when power is on after a sudden power loss. In this case, a journal replay operation may be performed. As described above, the journal data may be history information about updates of the meta-data. In other words, the changes in the meta-data before or after updating may be derived through the journal data. The meta-data read from the non-volatile memory device 1100 may include information before updating, not the latest information, and this information prior to updating may be rebuilt with the latest information through the journal replay operation.

Referring to FIG. 10, the memory controller 1200 may replay all journal entries corresponding to all meta-slices during the journal replay operation to thereby perform a meta-data rebuild operation. The memory controller 1200 may replay as many journal entries as the number of meta-slices in the meta-data.

For example, when meta-data includes twelve meta-slices and a flush operation has performed up to second meta-slice MS2, the memory controller 1200 may rebuild the latest meta-data by performing a journal replay operation on all journal entries in a reverse direction from a journal entry-14 corresponding to the second meta-slice MS2 which is the lastly flushed meta-slice to a journal entry-3 corresponding to a third meta-slice MS3 which is next to a second meta-slice MS2 corresponding to a journal entry-2. The number of journal entries to be replayed may be the same as the number of meta-slices in the meta-data. In the above-described example, the number of journal entries to be replayed and the number of meta-slices in the meta-data is twelve, respectively.

The memory system 1000 may rebuild the latest meta-data in the buffer memory device 1300 or the memory buffer 720 when the memory system 1000 is powered on again after a sudden power loss. The time taken to perform this rebuild operation may be referred to as "open time." In other words, it may take the open time to rebuild the latest meta-data in the buffer memory device 1300 or the memory buffer 720 by using the meta-data or the journal data stored in the non-volatile memory device 1100. The open time may account for a great part of the time taken to perform the journal replay operation. In other words, the memory controller 1200 may load all meta-slices to the buffer memory device 1300 or the memory buffer 720 during the open time.

Figure 11:
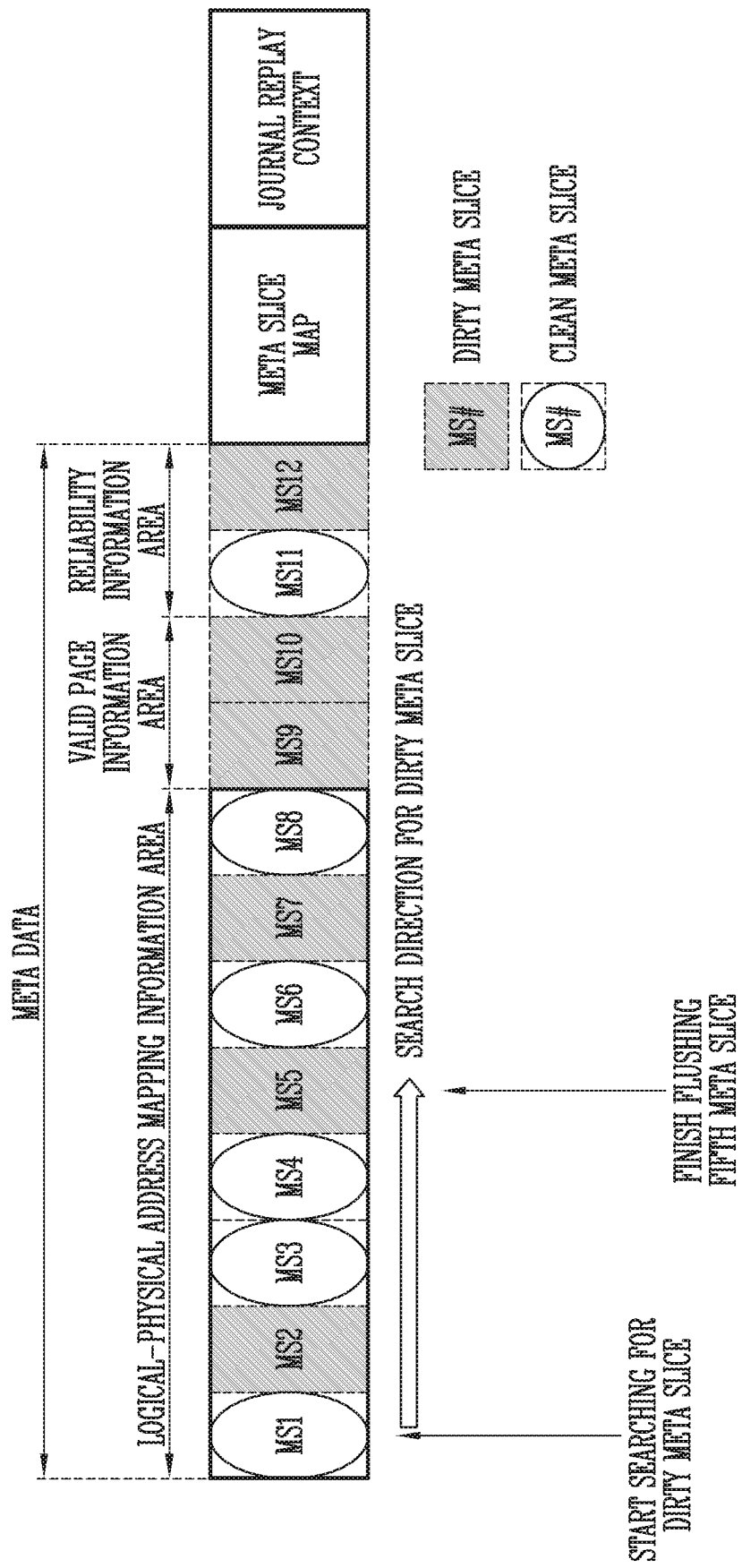
Figure 12:
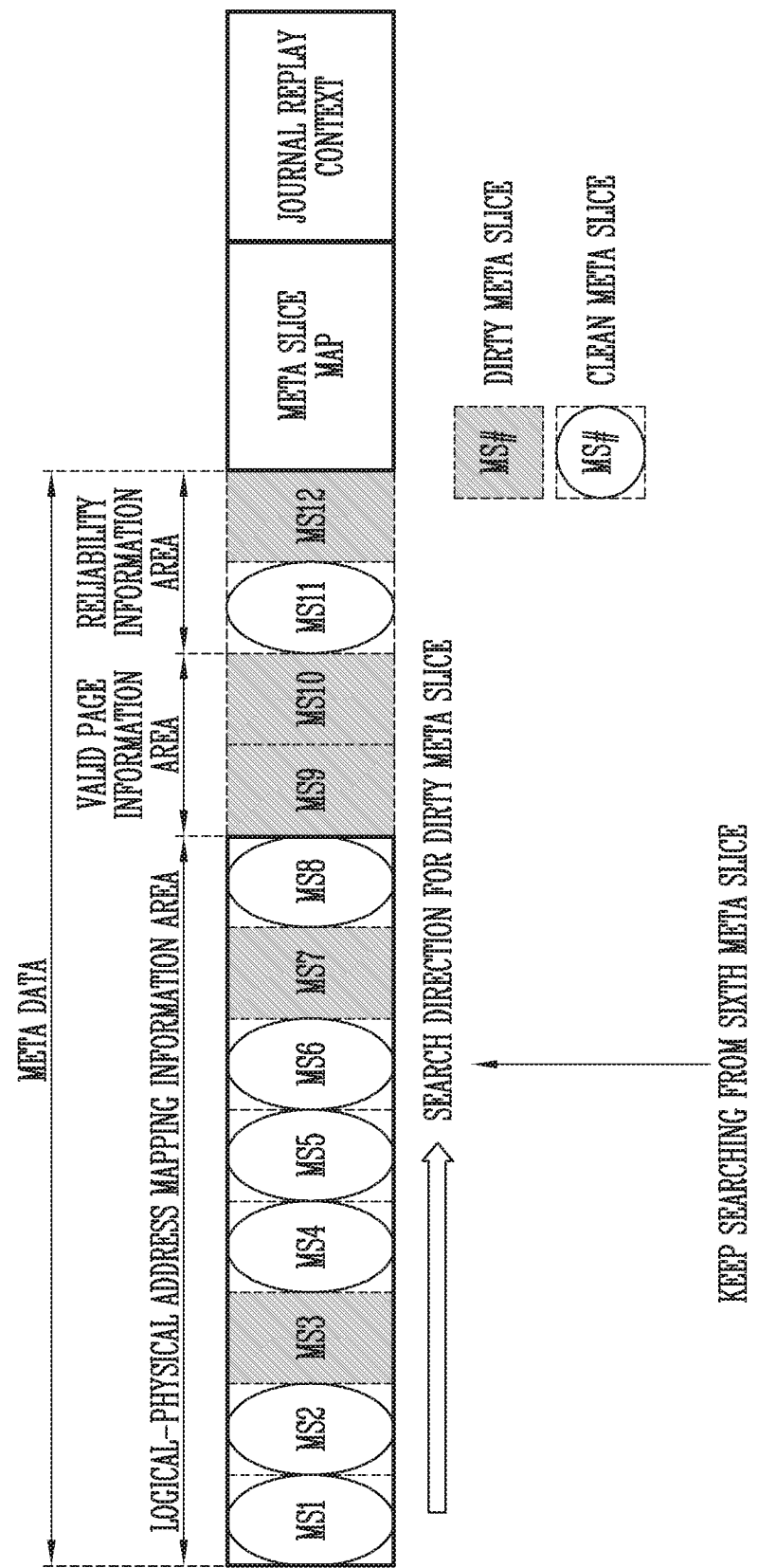
Figure 13:
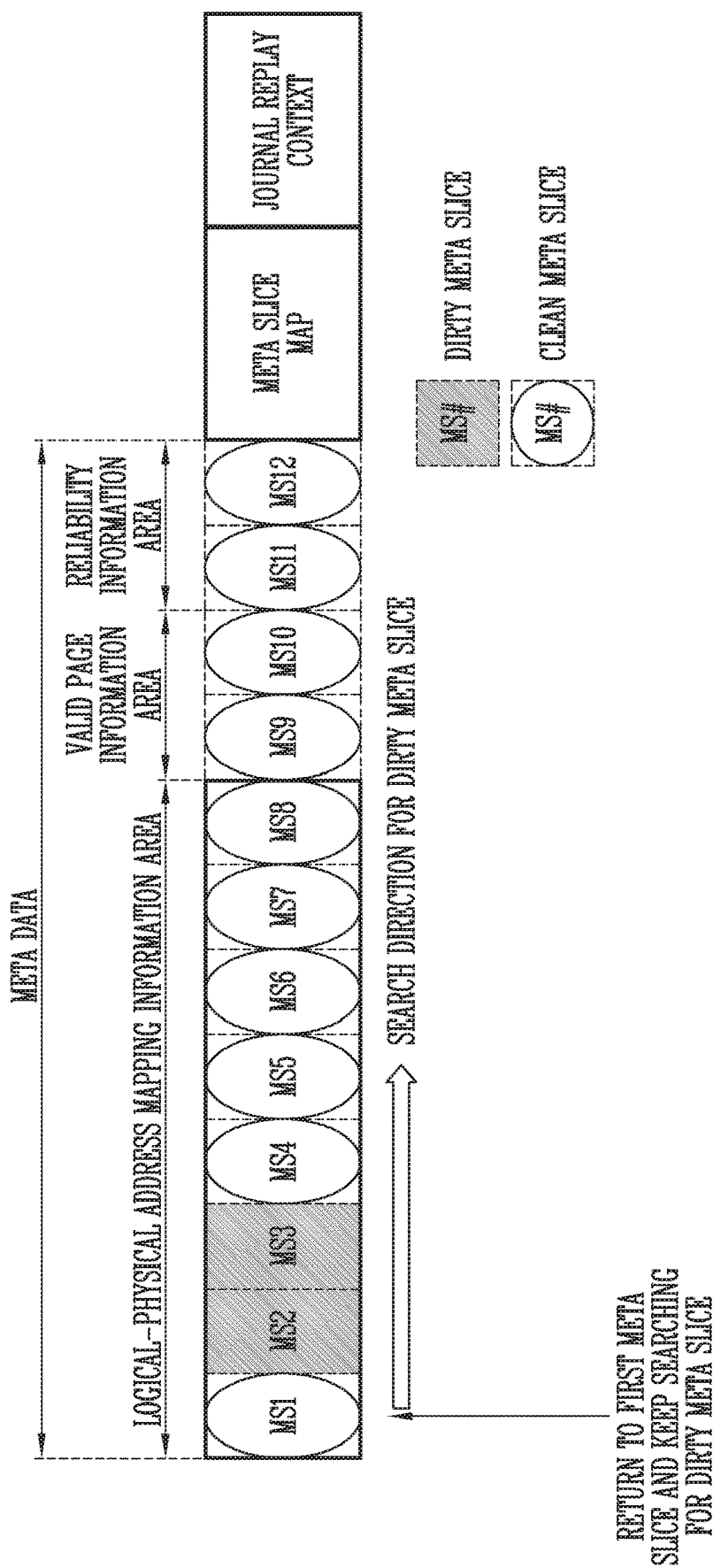
Figure 15:
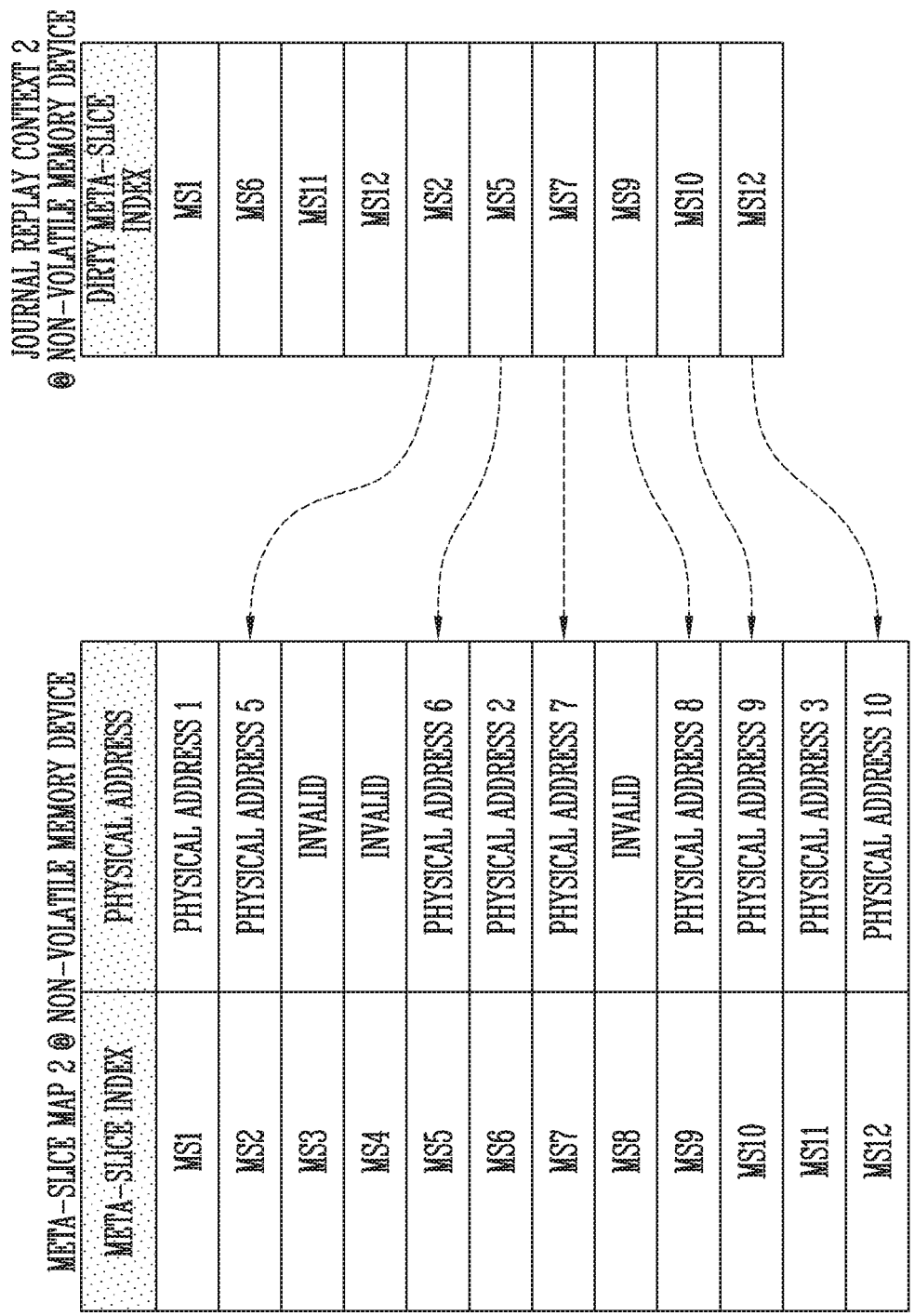
Figure 16:
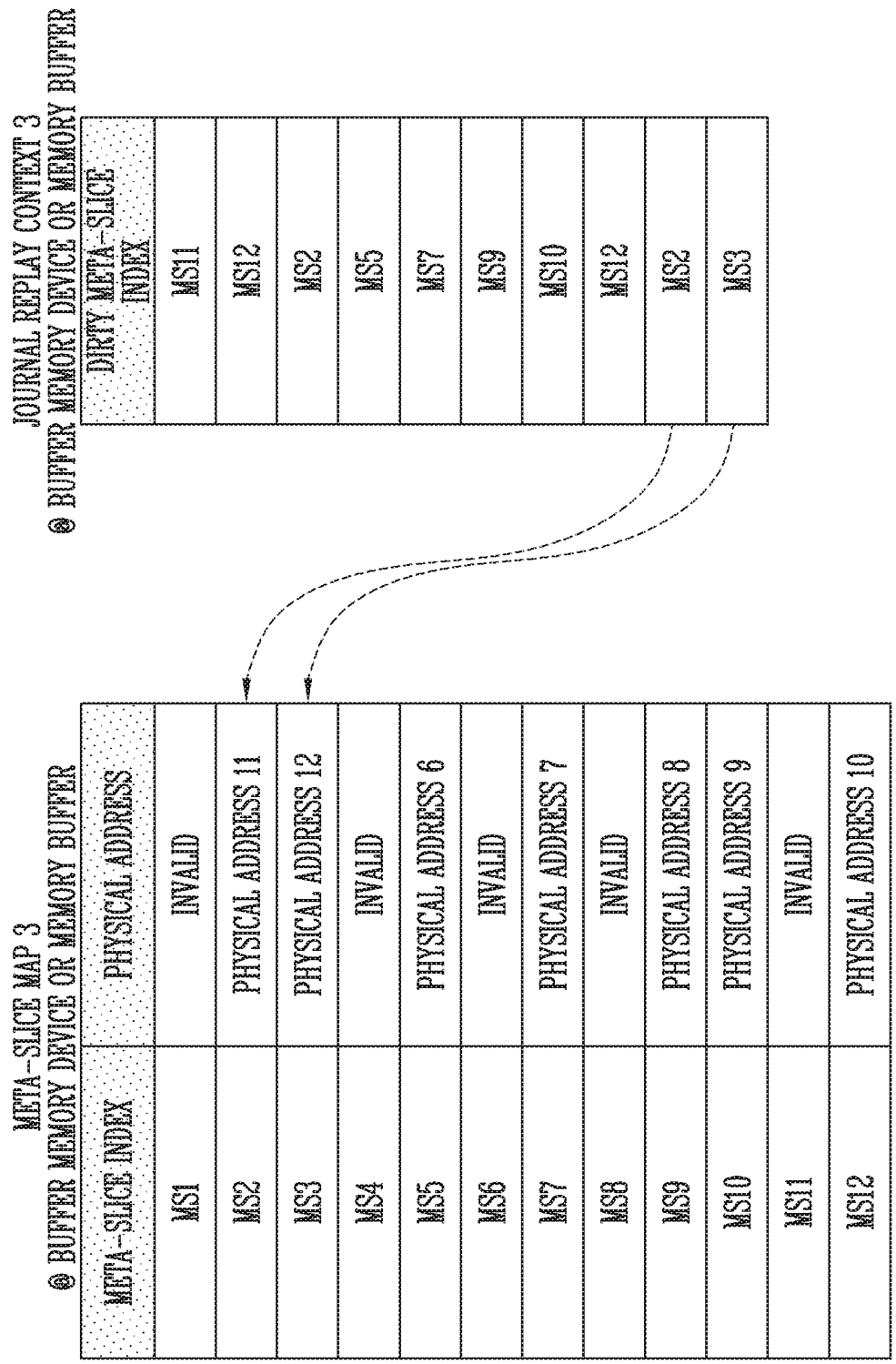

FIGS. 11 to 16 are diagrams illustrating a meta-data management method and a meta-data flush operation in accordance with an embodiment. FIGS. 11 to 13 exemplify the meta-data changing as the meta-data flush operation is being performed. FIGS. 14 and 15 show data structure flushed into the non-volatile memory device 1100. FIGS. 14 and 15 exemplify the flushed journal entries, meta-slices, meta-slice maps and journal replay contexts, which are sequentially flushed into the non-volatile memory device 1100 as exemplified with reference to FIGS. 11 to 13. FIG. 16 shows data structure stored in the buffer memory device 1300 or the memory buffer 720.

The meta-slices of the meta-data stored in the buffer memory device 1300 or the memory buffer 720 and the meta-slices of the meta-data stored in the non-volatile memory device 1100 may be the same as or different from each other. When the meta-slices of the meta-data stored in the buffer memory device 1300 or the memory buffer 720 are the same as the meta-slices of the meta-data stored in the non-volatile memory device 1100, these meta-slices may be referred to as "clean meta-slices." On the other hand, when the meta-slices of the meta-data stored in the buffer memory device 1300 or the memory buffer 720 are different from the meta-slices of the meta-data stored in the non-volatile memory device 1100, these meta-slices may be referred to as "dirty meta-slices."

The memory controller 1200 may update at least one of the meta-slices stored in the buffer memory device 1300 or the memory buffer 720. As a result, the updated meta-slice of the buffer memory device 1300 or the memory buffer 720 may be different from the meta-slice stored in the non-volatile memory device 1100.

The memory controller 1200 may perform a flush operation in units of meta-slices as described above, and during the flush operation, the memory controller 1200 may flush journal data together with a meta-slice to the non-volatile memory device 1100. The memory controller 1200 may perform a flush operation only on a dirty meta-slice and not for a clean meta-slice. The memory controller 1200 may mark the updated meta-slice of the buffer memory device 1300 or the memory buffer 720 as a dirty meta-slice, flush the dirty meta-slice to the non-volatile memory device 1100, and change the dirty meta-slice into a clean meta-slice.

Hereinafter, an embodiment of the invention will be described with reference to FIGS. 11 to 16 on the assumption that journal entries (journal entry-1, journal entry-2, journal entry-3 and journal entry-4), dirty meta-slices MS1, MS6, MS11 and MS12, a meta-slice map 1, and a journal replay context 1 are flushed to the non-volatile memory device 1100.

First, referring to FIGS. 11 and 14, when journal data are generated to a predetermined size, the memory controller 1200 may generate a journal entry and store the journal entry in the buffer memory device 1300 or the memory buffer 720. The journal entry may include the journal data with the predetermined size and information on a physical address storing the previously flushed meta-slice map. When the journal data are generated with the predetermined size, it may mean that the journal data are generated to a size corresponding to a storage area allocated to store the journal data. The storage area allocated to store the journal data may exist in the buffer memory device 1300 or the memory buffer 720.

The memory controller 1200 may search for a dirty meta-slice after generating the journal entry. For example, when the fifth journal entry-5 is generated since the journal data is filled up, the memory controller 1200 may search the meta-slices of the meta-data stored in the buffer memory device 1300 or the memory buffer 720 for a dirty meta-slice. For example, the dirty meta-slice may be searched for in ascending order beginning with the first meta-slice MS1. For example, the first meta-slice MS1 may be a clean meta-slice, and the second meta-slice MS2 may be a dirty meta-slice. The memory controller 1200 may flush both the fifth journal entry-5 and the second meta-slice MS2, stored in the buffer memory device 1300 or the memory buffer 720, to the non-volatile memory device 1100.

The memory controller 1200 may flush the second meta-slice MS2, which is the dirty meta-slice stored in the buffer memory device 1300 or the memory buffer 720, together with the fifth journal entry-5 to the non-volatile memory device 1100, and may then change the second meta-slice MS2 into a clean meta-slice. After the second meta-slice MS2 is flushed to the non-volatile memory device 1100, information of the second meta-slice MS2 stored in the non-volatile memory device 1100 and information of the second meta-slice MS2 stored in the buffer memory 1300 or the memory buffer 720 may be the same. Therefore, the second meta-slice may be a clean meta-slice.

After the memory controller 1200 flushes the second meta-slice MS2 together with the fifth journal entry-5 to the non-volatile memory device 1100, the memory controller 1200 may update the meta-slice map and the journal replay context stored in the buffer memory device 1300 or the memory buffer 720.

The meta-slice map may include information on physical addresses storing the dirty meta-slices flushed to the non-volatile memory device 1100 together with the journal entries. The journal replay context may include index information on dirty meta-slices flushed to the non-volatile memory device 1100. The journal replay context may have index information on a predetermined number of dirty meta-slices. For example, the journal replay context may include index information on ten dirty meta-slices. When index information on a new dirty meta-slice is added, index information on the oldest dirty meta-slice may be deleted. The memory controller 1200 may update the meta-slice map and the journal replay context stored in the buffer memory device 1300 or the memory buffer 720 each time the memory controller 1200 flushes a dirty meta-slice together with a journal entry to the non-volatile memory device 1100.

The memory controller 1200 may update the meta-slice map to include information on a physical address storing the dirty meta-slice flushed together with the journal entry. For example, the memory controller 1200 may reflect information on a physical address storing the second meta-slice MS2 flushed together with the fifth journal entry-5 into the meta-slice map stored in the buffer memory device 1300 or the memory buffer 720. A meta-slice and a journal entry which are flushed together may be stored at the same physical address of the non-volatile memory device 1100. In other words, the second meta-slice MS2 and the fifth journal entry-5 may be stored at the same physical address. Hereinafter, when a meta-slice and a journal entry are flushed together, it may be assumed that the corresponding meta-slice and the corresponding journal entry are stored at the same physical address of the non-volatile memory device 1100. A physical address may refer to an address corresponding to each of the pages included in a single memory block, or an address corresponding to each of the stripes included in a single super block. However, embodiments of the invention are not limited thereto.

The memory controller 1200 may update the journal replay context to include index information on the dirty meta-slice flushed to the non-volatile memory device 1100. For example, the memory controller 1200 may reflect index information on the second meta-slice MS2 flushed to the non-volatile memory device 1100 into the journal replay context stored in the buffer memory device 1300 or the memory buffer 720. The index information on the dirty meta-slice may be reflected to have the same order in which the dirty meta-slices are flushed.

Subsequently, when journal data are generated to the predetermined size again, the memory controller 1200 may generate a sixth journal entry-6. The memory controller 1200 may search for a dirty meta-slice in ascending order, i.e., in the same direction as the previous search direction for a dirty meta-slice, beginning from a meta-slice subsequent to the previously flushed second meta-slice MS2, i.e., the third meta-slice MS3. In other words, the search direction for a dirty meta-slice can be fixed without being varied in a predetermined direction.

For example, the third meta-slice MS3 and a fourth meta-slice MS4 may be clean meta-slices, and a fifth meta-slice MS5 may be a dirty meta-slice. The memory controller 1200 may keep searching for a dirty meta-slice in order starting from the meta-slice subsequent to the previously flushed second meta-slice MS2, i.e., the third meta-slice MS3, until a dirty meta-slice is detected. The memory controller 1200 may detect the fifth meta-slice MS5 which is the dirty meta-slice. The memory controller 1200 may then flush both the fifth meta-slice MS5 and the sixth journal entry-6 stored in the buffer memory device 1300 or the memory buffer 720 to the non-volatile memory device 1100, and may then change the fifth meta-slice MS5 into a clean meta-slice.

After the memory controller 1200 flushes the fifth meta-slice MS5 together with the sixth journal entry-6 to the non-volatile memory device 1100, the memory controller 1200 may update the meta-slice map and the journal replay context stored in the buffer memory device 1300 or the memory buffer 720.

As described above, the memory controller 1200 may search for a dirty meta-slice in ascending order beginning from a meta-slice subsequent to the previously flushed meta-slice whenever journal data are generated to the predetermined size. The dirty meta-slice may be searched for in the same direction as the previous search direction. In addition, the search direction for the dirty meta-slice may be fixed to the initially determined direction.

Referring to FIGS. 12 and 14, after the fifth meta-slice MS5 is flushed, the third meta-slice MS3 which is a clean meta-slice may be changed into the dirty meta-slice. In other words, the memory controller 1200 may update the third meta-slice MS3 stored in the buffer memory device 1300 or the memory buffer 720. As a result, the updated third meta-slice MS3 may be a dirty meta-slice.

Subsequently, when journal data are generated to the predetermined size again, the memory controller 1200 may generate a seventh journal entry-7, the memory controller 1200 may search for a dirty meta-slice again in ascending order beginning from a meta-slice subsequent to the previously flushed fifth meta-slice MS5, i.e., a sixth meta-slice MS6. In other words, the search may be performed in the same order as the previous search direction. As described above, the third meta-slice MS3, among meta-slices with smaller numbers than the sixth meta-slice MS6, may be dirty meta-slices. The memory controller 1200 may detect a seventh meta-slice MS7 with a greater meta-slice number than the sixth meta-slice MS6 in the above-described direction for searching for the dirty meta-slice. In other words, the memory controller 1200 may not change the dirty meta-slice search direction. Subsequently, the memory system 1000 may flush the seventh meta-slice MS7 together with the seventh journal entry-7 to the non-volatile memory device 1100, and may then change the seventh meta-slice MS7 into a clean meta-slice.

After the memory controller 1200 flushes the seventh meta-slice MS7 together with the seventh journal entry-7 to the non-volatile memory device 1100, the memory controller 1200 may update the meta-slice map and the journal replay context stored in the buffer memory device 1300 or the memory buffer 720.

In the above-described manner, the memory controller 1200 may flush the ninth meta-slice MS9, the tenth meta-slice MS10, and the twelfth meta-slice MS12 which are dirty meta-slices in a valid page information area and a reliability information area together with the eighth journal entry-8, the ninth journal entry-9, and the tenth journal entry-10, and may then change the ninth meta-slice MS9, the tenth meta-slice MS10, and the twelfth meta-slice MS12 into clean meta-slices. And, the memory controller 1200 may update the meta-slice map and the journal replay context stored in the buffer memory device 1300 or the memory buffer 720.

A meta-slice map in stored in the buffer memory device 1300 or the memory buffer 720 may include information about whether meta-slices included in the meta-data are clean or dirty. The memory controller 1200 may mark the updated meta-slice as a dirty meta-slice on the meta-slice map. In addition, the memory controller 1200 may use the information about whether each of the meta-slices included in the meta-slice map is clean or dirty during the dirty meta-slice search operation. In addition, after the memory controller 1200 flushes the dirty meta-slice to the non-volatile memory device 1100, the memory controller 1200 may unmark the corresponding meta-slice previously marked as the dirty meta-slice on the meta-slice map. In other words, after the memory controller 1200 flushes the dirty meta-slice to the non-volatile memory device 1100, the memory controller 1200 may mark the corresponding meta-slice as a clean meta-slice on the meta-slice map. In accordance with an embodiment, the information about whether the meta-slices are clear or dirty may be managed independently of the meta-slice map.

A dirty meta-slice may be searched for in a round-robin fashion. For example, the memory controller 1200 may search meta-slices for a dirty meta-slice in a sequential manner from the first meta-slice MS1 which is the first meta-slice to the twelfth meta-slice MS12 which is the last meta-slice. When the twelfth meta-slice MS12, the last meta-slice, is searched for the dirty meta-slice, it may be considered that one round is completed. When the one round is completed, the memory controller 1200 may search again the meta-slices for a dirty meta-slice in ascending order beginning from the first meta-slice MS1 which is the first meta-slice.

Whenever n rounds are completed, the memory controller 1200 may flush the meta-slice map and the journal replay context stored in the buffer memory device 1300 or the memory buffer 720 to the non-volatile memory device 1100, where n is a natural number. For example, each time one round is completed, the memory controller 1200 may flush the meta-slice map and the journal replay context stored in the buffer memory device 1300 or the memory buffer 720 to the non-volatile memory device 1100. As shown in FIG. 14, after the twelfth meta-slice MS12 which is the last meta-slice is flushed, a meta-slice map 2 and a journal replay context 2 may be flushed to the non-volatile memory device 1100. When the twelfth meta-slice MS12 which is the last meta-slice is flushed, it may mean that the twelfth meta-slice MS12 is searched for the dirty meta-slice and one round is completed. When the twelfth meta-slice MS12 is found to be a clean meta-slice, the journal entry-10 may be flushed together with the first found dirty meta-slice in the next round to the non-volatile memory device 1100.

As an example of the meta-slice map and the journal replay context flushed to the non-volatile memory device 1100, the meta-slice map 2 and the journal replay context 2 are shown in FIG. 15. Referring to FIGS. 14 and 15, it may be shown that index information on the dirty meta-slices MS2, MS5, MS7, MS9, MS10, and MS12 flushed after the journal replay context 1 is flushed is reflected in the journal replay context 2 flushed to the non-volatile memory device

1100. In addition, the meta-slice map 2 flushed to the non-volatile memory device 1100 may include information on physical addresses (physical address 5 to physical address 10) storing the dirty meta-slices MS2, MS5, MS7, MS9, MS10, and MS12 flushed after the meta-slice map 1 is flushed. The term 'Invalid" in the meta-slice map indicates that information on a physical address about a corresponding meta-slice is not included since the corresponding meta-slice is not corrected.

Referring to FIGS. 13 and 14, after the meta-slice map 2 and the journal replay context 2 are flushed to the non-volatile memory device 1100, when journal data journal data are generated to the predetermined size, the memory controller 1200 may generate an eleventh journal entry-11. The memory controller 1200 may re-start searching for the dirty meta-slice, starting from the dirty meta-slice MS1.

The memory controller 1200 may detect the second meta-slice MS2 which is the dirty meta-slice through the above search, and flush the second meta-slice MS2 together with the eleventh journal entry-11 to the non-volatile memory device 1100, and may then change the second meta-slice MS2 into a clean meta-slice.

After the memory controller 1200 flushes the second meta-slice MS2 together with the eleventh journal entry-11 to the non-volatile memory device 1100, the memory controller 1200 may update the meta-slice map and the journal replay context stored in the buffer memory device 1300 or the memory buffer 720.

Subsequently, when journal data are generated to the predetermined size, the memory controller 1200 may generate the twelfth journal entry-12, the memory controller 1200 may re-start searching for a dirty meta-slice from the third meta-slice MS3. The memory controller 1200 may flush the third meta-slice MS3 together with the twelfth journal entry-12 to the non-volatile memory device 1100 when the third meta-slice MS3 is the dirty meta-slice, and may then change the third meta-slice MS3 into a clean meta-slice.

After the memory controller 1200 flushes the third meta-slice MS3 together with the twelfth journal entry (journal entry-12) to the non-volatile memory device 1100, the memory controller 1200 may update the meta-slice map and the journal replay context stored in the buffer memory device 1300 or the memory buffer 720.

FIG. 16 shows an example in which information about the journal entries (journal entry-11 and journal entry-12) flushed together with the dirty meta-slices MS2 and MS3 is reflected in the buffer memory device 1300 or the memory buffer 720 after the meta-slice map 2 and the journal replay context 2 are flushed to the non-volatile memory device 1100.

Referring to FIG. 16, it may be shown that the information on physical addresses (physical address 11 and physical address 12) storing the journal entries (journal entry-11 and journal entry-12) flushed together with the dirty meta-slices MS2 and MS3 is reflected in a meta-slice map 3 stored in the buffer memory device 1300 or the memory buffer 720. In addition, it may be shown that index information on the dirty meta-slices MS2 and MS3 is reflected in a journal replay context 3 stored in the buffer memory device 1300 or the memory buffer 720.

When sudden power loss occurs before the meta-slice map 3 and the journal replay context 3 are flushed to the non-volatile memory device 1100, information in the meta-slice map 3 and the journal replay context 3 stored in the buffer memory device 1300 or the memory buffer 720 may disappear without being reflected in the non-volatile memory device 1100. Such information may be restored through a subsequent journal replay operation. This will be described below with the drawings.

Figure 17:
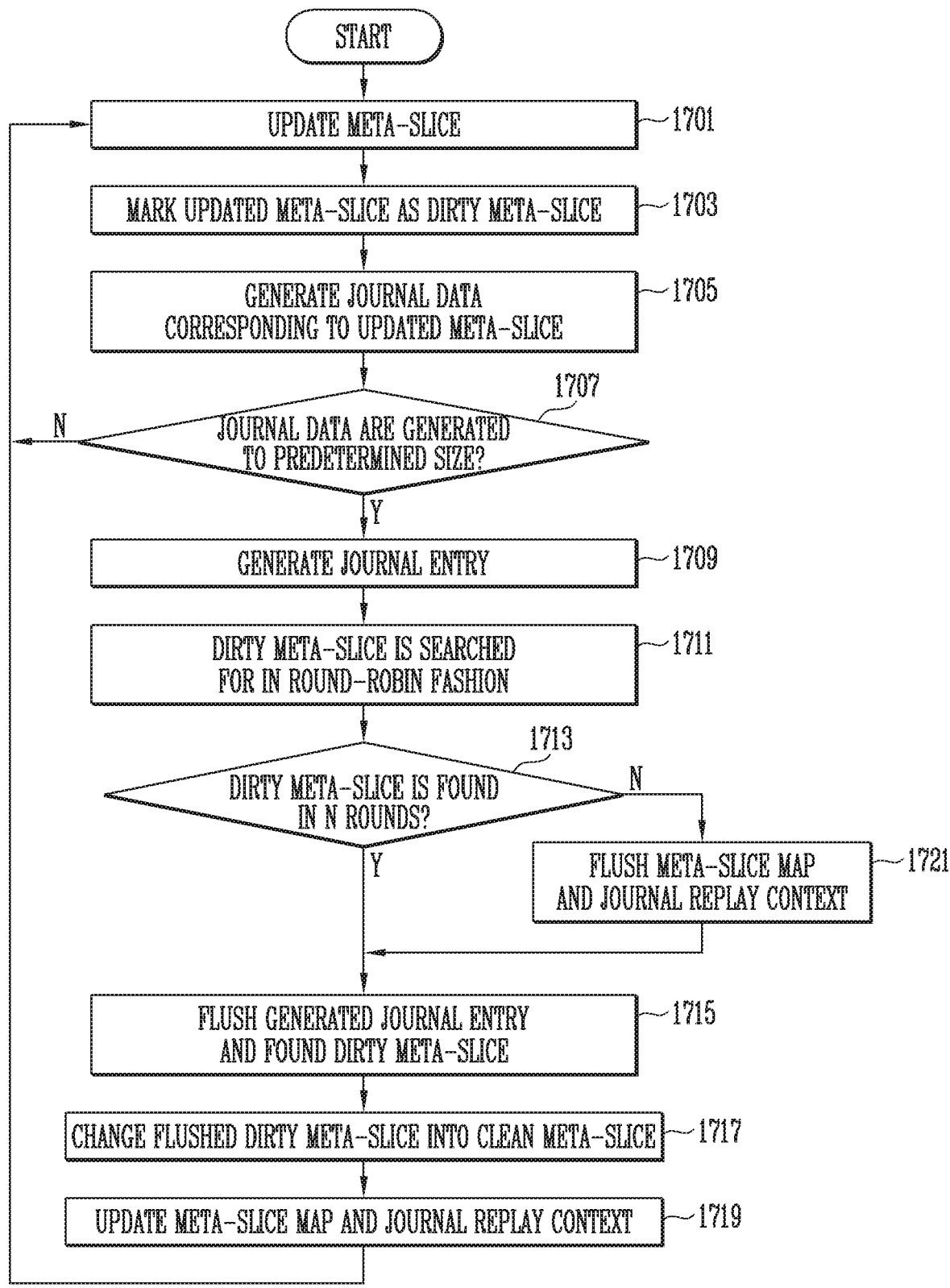
FIG. 17 is a flowchart illustrating a method of managing meta-data in accordance with to an embodiment.

FIG. 17 is a flowchart illustrating a method of managing meta-data in accordance with another embodiment.

In accordance with to an embodiment, at least one of the steps shown in FIG. 17 may be omitted, and the order of the steps may be changed.

At step 1701, the memory controller 1200 may update at least one of the meta-slices stored in the buffer memory device 1300 or the memory buffer 720.

At step 1703, the memory controller 1200 may mark the updated meta-slice as a dirty meta-slice.

At step 1705, the memory controller 1200 may generate journal data corresponding to the updated meta-slice. The journal data may include information about a meta-slice corresponding to a difference between before and after updating the meta-slice. For example, journal data may include a logical address, a previous physical address corresponding to the logical address, and an updated physical address corresponding to the logical address.

At step 1707, the memory controller 1200 may check whether journal data are generated to a predetermined size. When the journal data are generated to the predetermined size (Y), step 1709 may be performed, and otherwise (N), step 1701 may be performed.

At step 1709, the memory controller 1200 may generate a journal entry using the journal data. The journal entry may include information on a physical address storing the previous meta-slice map flushed to the non-volatile memory device 1100 and the journal data generated at step 1705.

At step 1711, the memory controller 1200 may search for a dirty meta-slice. The dirty meta-slice may be searched for in a round-robin fashion. In accordance with an embodiment, when a search for a dirty meta-slice is performed within one round, the search for the dirty meta-slice may be performed in ascending order beginning from a first meta-slice. In accordance with an embodiment, when the search for the dirty meta-slice is performed after the first meta-slice within the one round, a search for a dirty meta-slice may be performed in ascending order beginning from a meta-slice subsequent to the previously found dirty meta-slice.

At step 1713, the memory controller 1200 may determine whether the dirty meta-slice is found in n rounds, where n is a natural number. When the dirty meta-slice is found in the n rounds (Y), step 1715 may be performed, and otherwise (N), step 1721 may be performed.

At step 1715, the memory controller 1200 may flush the journal entry generated at step 1709 and the dirty meta-slice found at step 1713 to the non-volatile memory device 1100.

At step 1717, the memory controller 1200 may change the dirty meta-slice flushed to the non-volatile memory device 1100 into a clean meta-slice.

At step 1719, the memory controller 1200 may update the meta-slice map and the journal replay context. For example, the memory controller 1200 may reflect information on a physical address storing the journal entry and the dirty meta-slice flushed at step 1715 in the meta-slice map. For example, the memory controller 1200 may reflect an index of the dirty meta-slice flushed at step 1715 in the journal replay context.

At step 1721 which is performed based on the determination result of step 1713 that the dirty meta-slice is not found in the round, the memory controller 1200 may flush the meta-slice map and the journal replay context to the non-volatile memory device 1100.

Thereafter, step 1715 may be performed.

Figure 18:
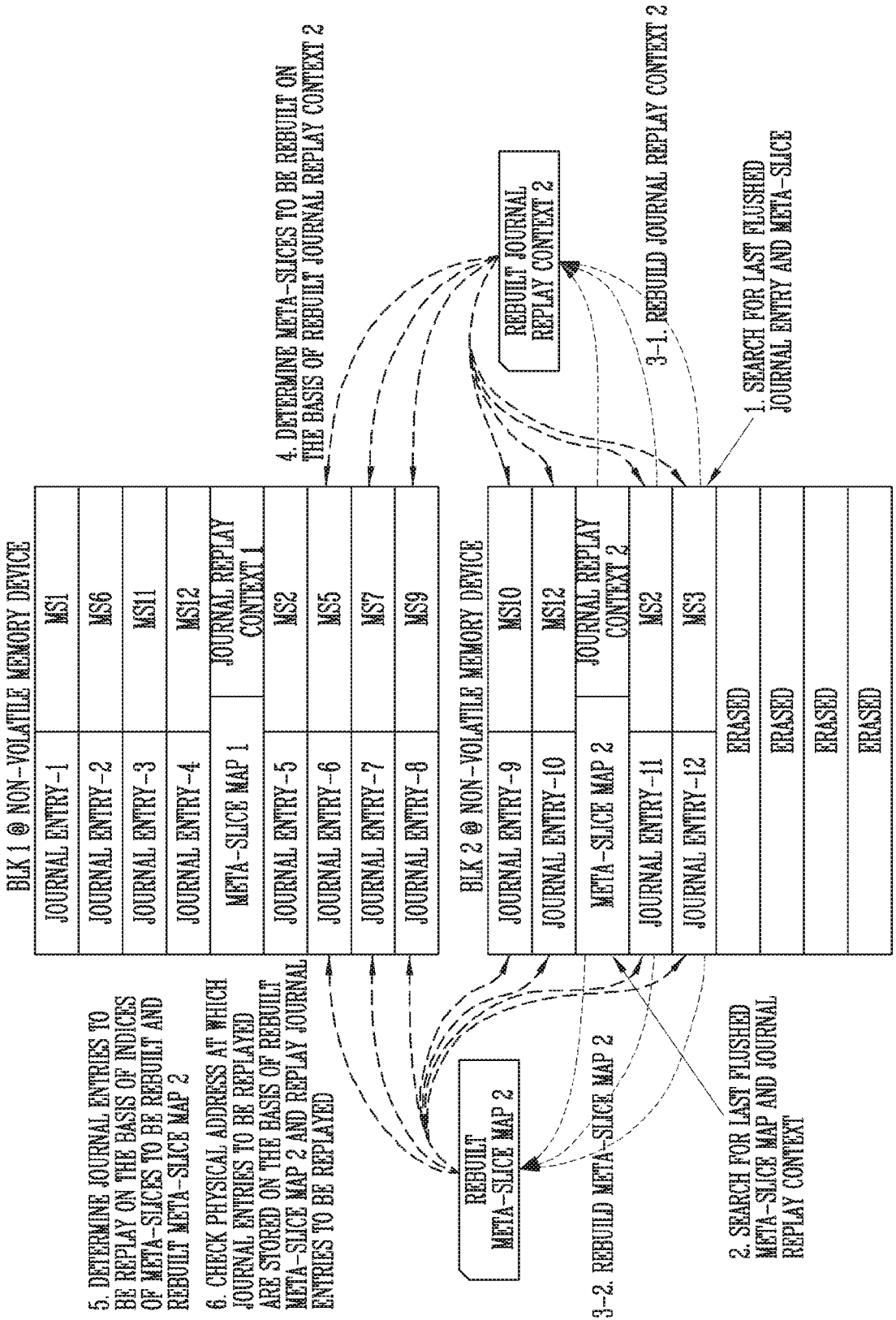
FIGS. 18 and 19 are diagrams illustrating a journal replay operation in accordance with an embodiment.
Figure 19:
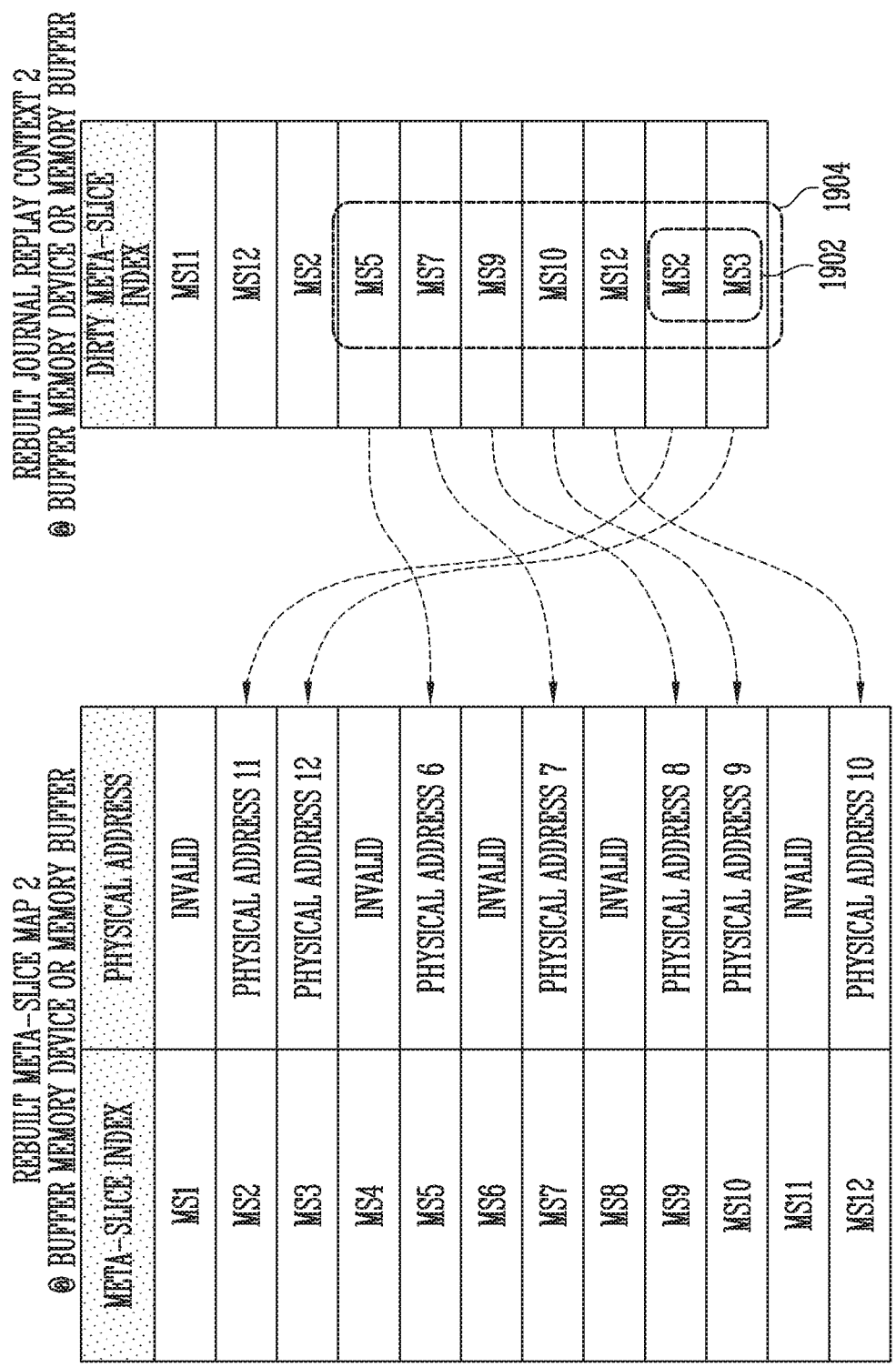

FIGS. 18 and 19 are diagrams illustrating a journal replay operation in accordance with an embodiment. FIG. 18 shows an example in which the information used to rebuild the meta-data are flushed to the non-volatile memory device 1100. FIG. 19 shows an example of a process in which the meta-data is rebuilt in the buffer memory device 1300 or the memory buffer 720.

During most of the open time of the memory system 1000, logical-physical address mapping information may be rebuilt in the buffer memory device 1300 or the memory buffer 720. Therefore, for a quick response upon a power-on, the time taken to open the logical-physical address mapping information should be reduced. When the logical-physical address mapping information is opened, it may mean that the latest logical-physical address mapping information may be loaded to the buffer memory device 1300 or the memory buffer 720.

However, when power is on after a special occasion, such as a sudden power loss, it may take a longer time to rebuild the logical-physical address mapping information. For example, when the entirety of the meta-slices are loaded to the buffer memory 1300 or the memory buffer 720 to rebuild the meta-data and the journal data is replayed, it may take a long time to open the logical-physical address mapping information. Therefore, in accordance with an embodiment of the present invention a method is provided which can reduce the number of journal entries to be replayed for rebuilding the meta-data in a shorter time.

FIG. 18 shows an example in which the information used to rebuild the meta-data are flushed to the two memory blocks BLK1 and BLK2. However, the invention is not limited thereto.

Referring to FIG. 18, in accordance with the method, the memory controller 1200 may search the non-volatile memory device 1100 for the most recent meta-slice, i.e., the lastly flushed journal entry and meta-slice, during a journal replay operation. For example, when the two memory blocks BLK1 and BLK2 are allocated as a storage area for storing information used to rebuild meta-data, the memory controller 1200 may sequentially access a physical address of the memory blocks BLK1 and BLK2 so as to check a physical address at which data is recorded last. The memory controller 1200 may determine that the last flushed journal entry and meta-slice are stored in the above-checked physical address. FIG. 18 shows an example in which the journal entry-12 and the meta-slice 3 (MS3) are found as the last flushed journal entry and meta-slice.

Subsequently, the memory controller 1200 may search for the last flushed meta-slice map and journal replay context. As described above, each of the journal entries may include information on a physical address including the last flushed meta-slice map and journal replay context. Therefore, the memory controller 1200 may check a physical address at which the last flushed meta-slice map and journal replay context are stored with reference to the journal entry-12, and may access the checked physical address to search for the last flushed meta-slice map and journal replay context. In the embodiment described with reference to FIG. 18, the meta-slice map 2 may be found as the last flushed meta-slice map and the journal replay context 2 may be found as the last flushed journal replay context.

Subsequently, the memory controller 1200 may load the journal replay context 2 and the meta-slice map 2 into the buffer memory device 1300 or the memory buffer 720, and may rebuild the journal replay context 2 and the meta-slice map 2 in the buffer memory device 1300 or the memory buffer 720. According to an embodiment, the memory controller 1200 may rebuild the journal replay context 2 so as to include index information on meta-slices flushed after the journal replay context 2 is flushed, i.e., the meta-slice 2 (MS2) and the meta-slice 3 (MS3).

FIG. 19 shows an example of the rebuilt journal replay context 2. Referring to FIG. 19, in comparison with the journal replay context 2 before rebuilding as shown in FIG. 15, index information 1902 of the meta-slice 2 (MS2) and the meta-slice 3 (MS3) may be added to the rebuild journal replay context 2. In other words, it may be seen that the information in the journal replay context 3 which disappears not to be flushed to the non-volatile memory device 1100 due to the sudden power loss as described with reference to FIG. 16 is reflected in the rebuilt journal replay context 2 as shown in FIG. 19.

The memory controller 1200 may then determine meta-slices to be rebuilt based on the rebuilt journal replay context 2. The meta-slices to be rebuilt may refer to dirty meta-slices to be loaded into the buffer memory device 1300 or the memory buffer 720 and to be rebuilt, among the dirty meta-slices flushed to the non-volatile memory device 1100.

The memory controller 1200 may determine an index set corresponding to the meta-slices to be rebuilt. The index set may be determined to include as many indices of meta-slices sequentially adjacent to the last meta-slice in the rebuilt journal replay context 2 as possible as well as an index of the last meta-slice. In addition, an index of the first meta-slice, among the indices of the sequentially adjacent meta-slices, may be determined to be greater than the index of the last meta-slice. For example, referring to FIG. 19, indices corresponding to sequential meta-slices MS5-MS7-MS9-MS10-MS12-MS2-MS3 may be determined as an index set 1904. The memory controller 1200 may determine the meta-slices corresponding to the index set 1904 as meta-slices to be rebuilt.

Referring to FIG. 18 again, the memory controller 1200 may rebuild the meta-slice map 2 by reflecting information on physical addresses storing meta-slices flushed after the meta-slice map 2 is flushed, i.e., the meta-slices 2 (MS2) and the meta-slice 3 (MS3). FIG. 19 shows an example of the rebuilt meta-slice map 2. Referring to FIG. 19, it may be shown that information about the meta-slice 2 (MS2) and the meta-slice 3 (MS3) is added to the rebuilt meta-slice map 2 in comparison with the meta-slice map 2 before rebuilding as shown in FIG. 15. In other words, it may be seen that the information in the meta-slice map 3 which disappears not to be flushed to the non-volatile memory device 1100 due to the sudden power loss as described with reference to FIG. 16 is reflected in the rebuilt meta-slice map 2 as shown in FIG. 19.

In the above-described example, the journal entries and the meta-slices flushed after the meta-slice map 2 and the journal replay context 2 are flushed may be checked by sequentially accessing physical addresses subsequent to the physical address at which the meta-slice map 2 and the journal replay context 2 are stored.

The memory controller 1200 may determine journal entries to be replayed on the basis of indices of meta-slices to be rebuilt and the rebuilt meta-slice map. For example, the memory controller 1200 may determine the journal entries, flushed together with the meta-slices to be rebuilt, as the journal entries to be replayed. In the example shown in FIGS. 18 and 19, the journal entries (journal entry-5 to journal entry-12) flushed together with the meta-slices MS5, MS7, MS9, MS10, MS12, MS2, and MS3 to be rebuilt may be determined as the journal entries to be replayed.

The memory controller 1200 may check a physical address at which the journal entries to be replayed are stored based on the rebuilt meta slice map 2 and access the checked physical address to load the journal entries to be replayed and the meta-slices to be rebuilt into the buffer memory device 1300 or the memory buffer 720.

The memory controller 1200 may rebuild the meta-data by correcting the loaded meta-slices while replaying the loaded journal entries to be replayed. The journal entries to be replayed may be replayed in order in which the journal entries are flushed to the non-volatile memory device 1100. The memory controller 1200 may perform a journal replay operation starting from a first journal entry to be replayed, i.e., the sixth journal entry-6 up to the last flushed twelfth journal entry-12. In this manner, the journal replay operation may be completed.

In the example described with reference to FIGS. 18 and 19, since the memory controller 1200 replays only journal entries corresponding to meta-slices between the fifth meta-slice MS5 to the third meta-slice MS3, the number of journal entries to be replayed may be smaller than that of the example described with reference to FIG. 10. For example, when a journal replay operation is performed on only journal entries corresponding to dirty meta-slices included in one round to rebuild the recent meta-data, the number of journal entries to be replayed may be smaller than that of the example described with reference to FIG. 10. More specifically, in the above example, there may be seven journal entries to be replayed, but the twelve meta-slices may be included in the meta-data.

A journal entry with respect to a meta-slice which is not loaded may not be replayed since a meta-slice reflecting changes is stored behind. Therefore, the number of meta-data to be rebuilt during a journal replay operation may be smaller than that of the example described with reference to FIG. 10, so that the time for the journal replay operation may be reduced. As a result, the open time of the memory system 1000 may be reduced.

For example, when a random write request is frequently input, the number of dirty meta-slices included in the entirety of the meta-slices in the meta-data may be much smaller than that of clean meta-slices since new logical-physical address mapping information is generated rather than existing logical-physical address mapping information is updated due to the random write request. In this example, since the meta-data to be rebuilt during the journal replay operation may be much smaller than the entire meta-data, the time taken for the journal replay operation may be significantly reduced, so that the open time of the memory system 1000 may be reduced.

Figure 20:
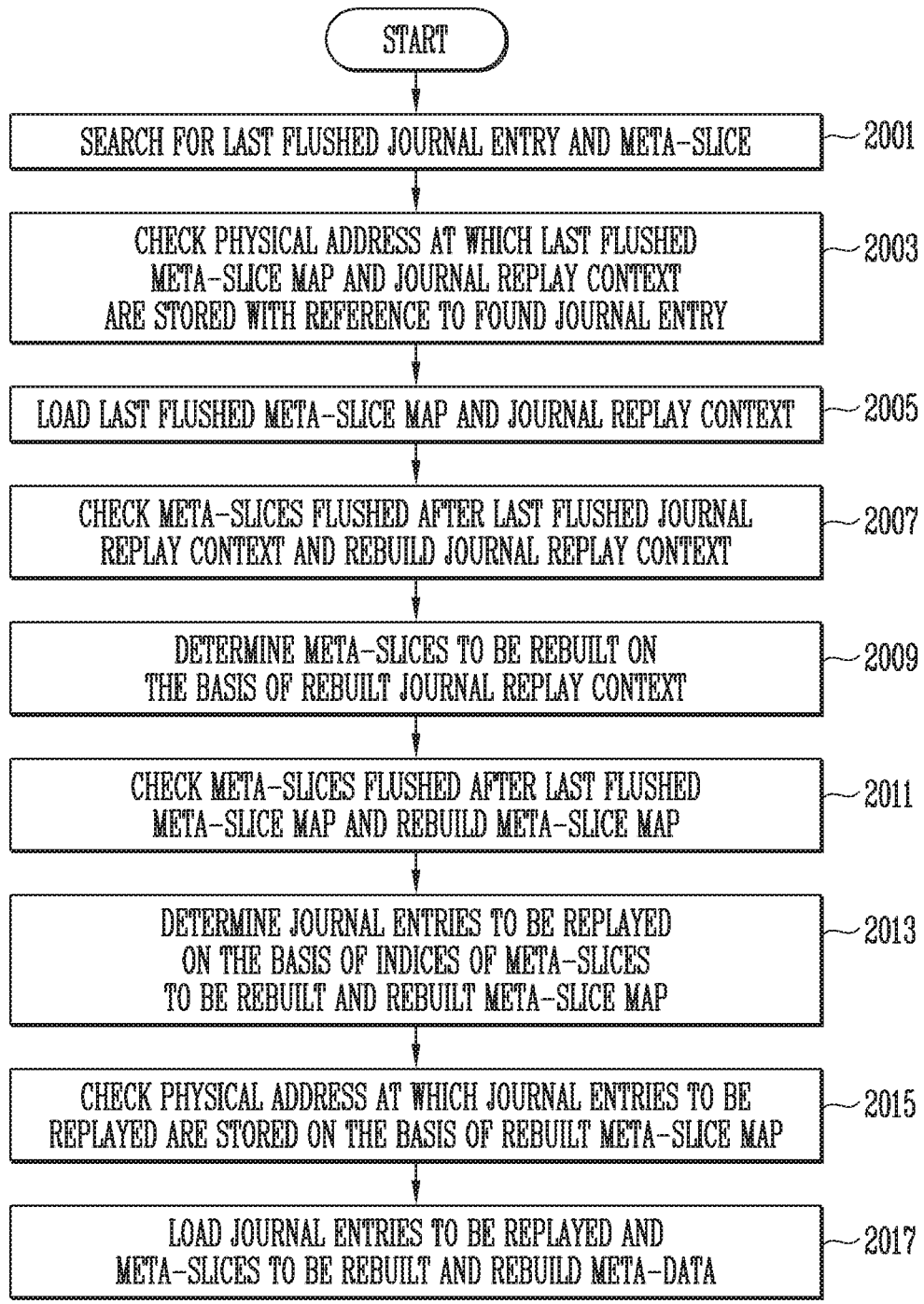
FIG. 20 is a flow chart illustrating a journal replay operation in accordance with an embodiment.

FIG. 20 is a flow chart illustrating a journal replay operation in accordance with an embodiment.

Steps in FIG. 20 may be performed when sudden power loss occurs during the steps in FIG. 17 and power is on again. However, embodiments are not limited thereto. In accordance with an embodiment, at least one of the steps shown in FIG. 20 may be omitted, and the order of the steps may be changed.

At step 2001, the memory controller 1200 may search for a journal entry and a meta-slice which are last flushed to the non-volatile memory device 1100.

At step 2003, the memory controller 1200 may check a physical address at which the meta-slice map and the journal replay context which are last flushed to the non-volatile memory device 1100 with reference to the found journal entry.

At step 2005, the memory controller 1200 may access the physical address checked at step 2003 and load the meta-slice map and the journal replay context which are last flushed to the non-volatile memory device 1100 into the buffer memory device 1300 or the memory buffer 720.

At step 2007, the memory controller 1200 may check meta-slices flushed after the last flushed journal replay context and rebuild the journal replay context.

At step 2009, the memory controller 1200 may determine meta-slices to be rebuilt on the basis of the rebuilt journal replay context.

At step 2011, the memory controller 1200 may check meta-slices flushed after the last flushed meta-slice map and rebuild the meta-slice map.

At step 2013, the memory controller 1200 may determine journal entries to be replayed on the basis of indices of meta-slices to be rebuilt and the rebuilt meta-slice map.

At step 2015, the memory controller 1200 may check a physical address at which the journal entries to be replayed are stored on the basis of the rebuilt meta-slice map.

At step 2017, the memory controller 1200 may access the physical address checked at step 2015 and load the journal entries to be replayed and the meta-slices to be rebuilt into the buffer memory device 1300 or the memory buffer 720. The memory controller 1200 may replay the journal entries to be replayed and correct the meta-slices to be rebuilt. In this manner, the latest meta-data may be rebuilt.

Meta-slices, which are not the meta-slices to be rebuilt, may be loaded individually or collectively into the buffer memory device 1300 or the memory buffer 720. For example, a meta-slice including mapping information about a corresponding physical address may be loaded into the buffer memory device 1300 or the memory buffer 720 each time it is necessary to access a physical address included in the meta-slices which are not the meta-slices to be rebuilt.

Figure 21:
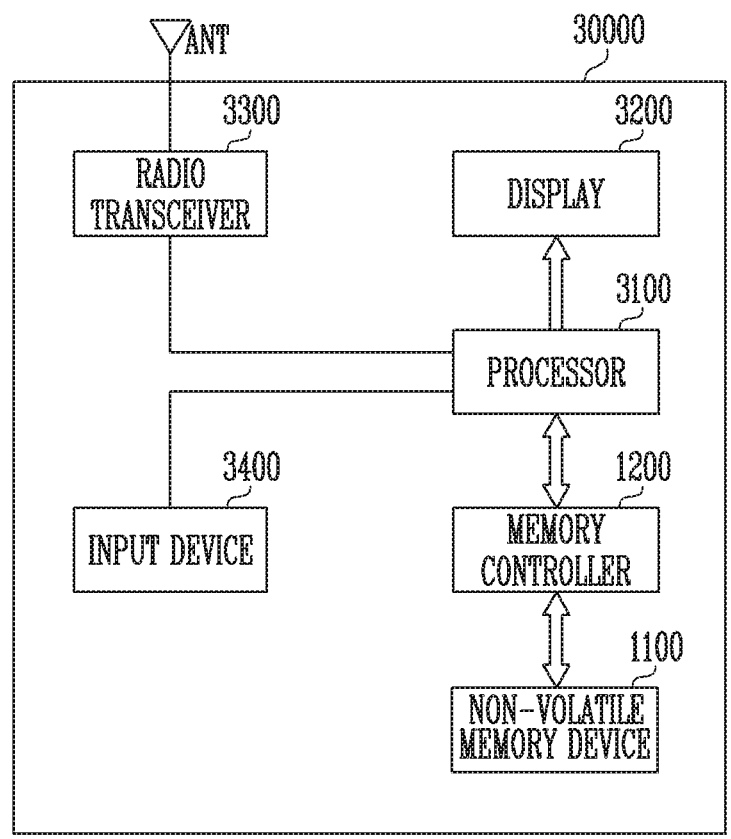
FIG. 21 is a diagram illustrating an embodiment of a memory system.

FIG. 21 is a diagram illustrating an embodiment of the non-volatile memory system.

Referring to FIG. 21, a memory system 30000 may be embodied in a cellular phone, a smartphone, a tablet PC, a personal digital assistant (PDA), or a wireless communication device. The memory system 30000 may include the non-volatile memory device 1100 and the memory controller 1200 controlling the operations of the non-volatile memory device 1100. The memory controller 1200 may control a data access operation of the non-volatile memory device 1100, for example, a program operation, an erase operation, or a read operation in response to control of the processor 3100.

The memory controller 1200 may control data programmed into the non-volatile memory device 1100 to be output through a display 3200.

A radio transceiver 3300 may exchange a radio signal through an antenna ANT. For example, the radio transceiver 3300 may change the radio signal received through the antenna ANT into a signal which can be processed by the processor 3100. Therefore, the processor 3100 may process the signal output from the radio transceiver 3300 and transfer the processed signal to the memory controller 1200 or the display 3200. The memory controller 1200 may program the signal processed by the processor 3100 into the non-volatile semiconductor memory device 1100. In addition, the radio transceiver 3300 may change a signal output from the processor 3100 into a radio signal, and output the radio signal to an external device through the antenna ANT. A control signal for controlling the operations of the processor 3100 or data to be processed by the processor 3100 may be input by the input device 3400, and the input device 3400 may include a pointing device, such as a touch pad and a computer mouse, a keypad, or a keyboard. The processor 3100 may control the operations of the display 3200 so that data output from the memory controller 1200, data output from the radio transceiver 3300, or data output from the input device 3400 may be output through the display 3200.

In accordance with an embodiment, the memory controller 1200 controlling the operations of the non-volatile memory device 1100 may form part of the processor 3100, or be formed as a separate chip from the processor 3100. In addition, the memory controller 1200 may be formed by the example of the memory controller shown in FIG. 2.

Figure 22:
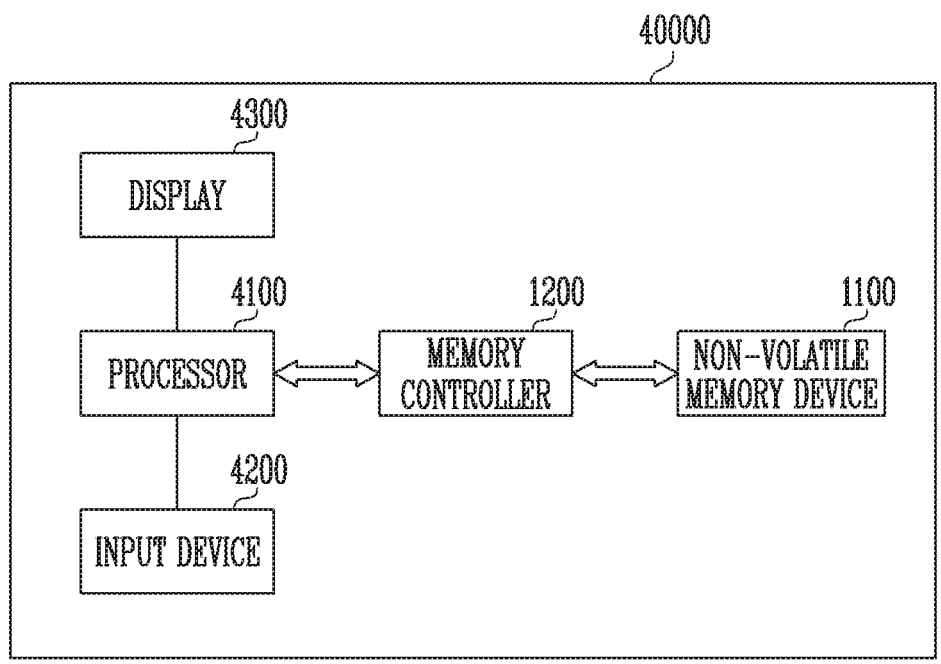
FIG. 22 is a diagram illustrating an embodiment of a memory system.

FIG. 22 is a diagram illustrating an embodiment of the memory system.

Referring to FIG. 22, a memory system 40000 may be embodied into a personal computer (PC), a tablet PC, a net-book, an e-reader, a personal digital assistant (PDA), a portable multimedia player (PMP), an MP3 player, or an MP4 player.

The memory system 40000 may include the non-volatile memory device 1100 and the memory controller 1200 controlling the operations of the non-volatile memory device 1100.

A processor 4100 may output data stored in the non-volatile memory device 1100 through a display 4300 according to data input through an input device 4200. Examples of the input device 4200 may include a pointing device such as a touch pad or a computer mouse, a keypad, or a keyboard.

The processor 4100 may control the general operations of the memory system 40000 and control the operations of the memory controller 1200. In accordance with an embodiment, the memory controller 1200 controlling the operations of the non-volatile memory device 1100 may form part of the processor 4100, or be formed as a separate chip from the processor 4100. In addition, the memory controller 1200 may be formed by the example of the memory controller shown in FIG. 2.

Figure 23:
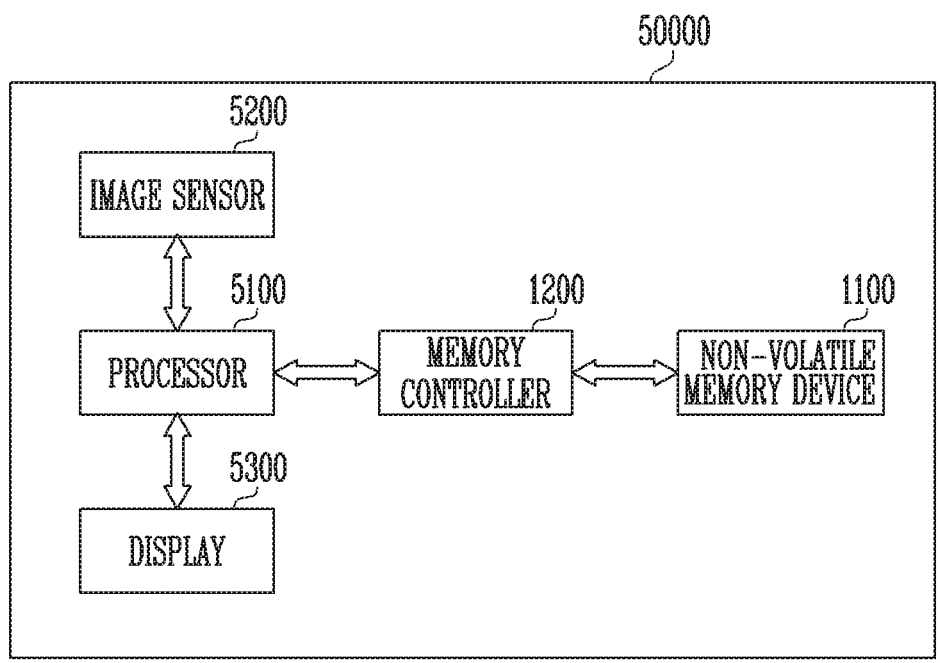
FIG. 23 is a diagram illustrating an embodiment of a memory system.

FIG. 23 is a diagram illustrating an embodiment of the memory system.

Referring to FIG. 23, a memory system 50000 may be provided as an image processing device, for example, a digital camera, a mobile phone attached with a digital camera, a smart phone attached with a digital camera, or a tablet PC attached with a digital camera.

The memory system 50000 may include the non-volatile memory device 1100 and the memory controller 1200 controlling a data processing operation of the non-volatile memory device 1100, for example, a program operation, an erase operation or a read operation.

An image sensor 5200 of the memory system 50000 may convert an optical image into digital signals, and the converted digital signals may be transferred to the processor 5100 or the memory controller 1200. In response to control of the processor 5100, the converted digital signals may be output through the display 5300 or stored in the semiconductor non-volatile memory device 1100 through the memory controller 1200. The memory controller 1200 may control data programmed into the non-volatile memory device 1100 to be output through a display 5300.

In accordance with an embodiment, the memory controller 1200 controlling the operations of the non-volatile memory device 1100 may form part of the processor 5100, or be formed as a separate chip from the processor 5100. In addition, the memory controller 1200 may be formed by the example of the memory controller shown in FIG. 2.

Figure 24:
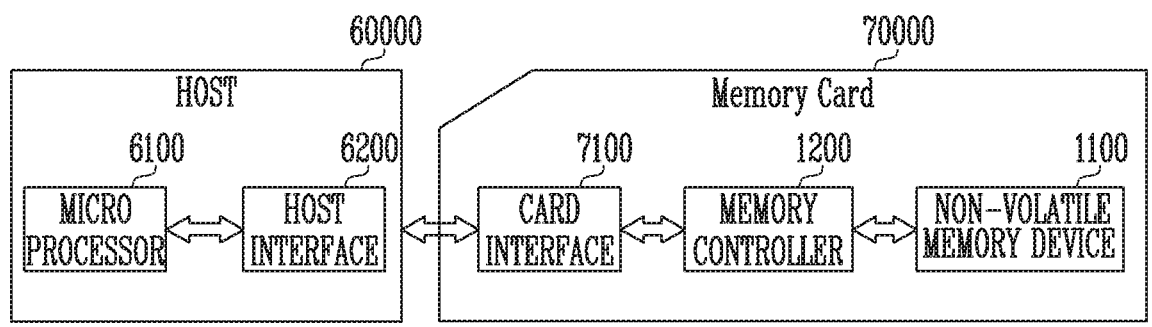
FIG. 24 is a diagram illustrating an embodiment of a memory system.

FIG. 24 is a diagram illustrating an embodiment of the memory system.

Referring to FIG. 24, a memory system 70000 may include a memory card or a smart card. The memory system 70000 may include the non-volatile memory device 1100, the memory controller 1200, and a card interface 7100.

The memory controller 1200 may control data exchange between the semiconductor non-volatile memory device 1100 and the card interface 7100. In an embodiment, the card interface 7100 may be, but not limited to, a secure digital (SD) card interface or a multi-media card (MMC) interface. Further, the memory controller 1200 may be formed through the example of the memory controller illustrated in FIG. 2.

The card interface 7100 may interface data exchange between a host 60000 and the memory controller 1200 according to a protocol of the host 60000. In accordance with an embodiment, the card interface 7100 may support a Universal Serial Bus (USB) protocol and an InterChip (IC)-USB protocol. The card interface may refer to hardware capable of supporting a protocol which is used by the host 60000, software installed in the hardware, or a signal transmission method.

When the memory system 70000 is connected to a host interface 6200 of the host 60000 such as a PC, a tablet PC, a digital camera, a digital audio player, a cellular phone, console video game hardware or a digital set-top box, the host interface 6200 may perform data communication with the non-volatile memory device 1100 through the card interface 7100 and the memory controller 1200 under the control of a microprocessor 6100.

In accordance with the present disclosure, in connection with operations of a memory system, the time taken to rebuild meta-data may be reduced.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A memory system, comprising:
    a non-volatile memory device including a plurality of memory blocks each including a plurality of pages for storing data;
    a buffer memory configured to store meta-data including a plurality of meta-slices; and
    a memory controller configured to generate a journal entry including update information about a type of an operation which causes changes in one meta-slice among the plurality of meta-slices to a dirty meta-slice corresponding to an updated meta-slice among the plurality of meta-slices, and control the non-volatile memory device and the buffer memory to store the journal entry and the dirty meta-slice among the plurality of meta-slices in the non-volatile memory device,
    wherein the plurality of meta-slices correspond to a plurality of stripes, respectively, and
    wherein the plurality of stripes each include at least two or more pages among the plurality of pages.

2. The memory system of claim 1,
    wherein the update information includes data related to updates in the meta-data, and data restoring the meta-data.

3. The memory system of claim 1,
    wherein the meta-data includes at least one of logical-physical address mapping information, valid page information, or reliability information.

4. The memory system of claim 1,
    wherein the memory controller is configured to:

repeatedly perform an operation of detecting the dirty meta-slice, a plurality of meta-slice numbers respectively corresponding to the plurality of meta-slices, from a meta-slice having a smallest meta-slice number to a meta-slice having a highest meta-slice number, generate a meta-slice map including physical address information indicating a location to be stored of the dirty meta-slice in the non-volatile memory device and a journal entry context storing index information of the dirty meta-slice according to an order in which the dirty meta-slice is detected among the plurality of meta-slices, and control the non-volatile memory device to store the meta-slice map and the journal entry context generated in the buffer memory.

5. The memory system of claim 4,
wherein the memory controller repeatedly updates the meta-slice map and the journal entry context in response to the dirty meta-slice and the journal entry stored in the non-volatile memory device, and generates an updated meta-slice map and an updated journal entry context.

6. The memory system of claim 5,
wherein the memory controller controls the non-volatile memory device to store the updated meta-slice map and the updated journal entry context.

7. The memory system of claim 4,
wherein the memory controller controls the journal entry context to delete the index information of the dirty meta-slice stored in the journal entry context for the first time, if a number of index information stored in the journal entry context exceeds a threshold.

8. A memory system, comprising:
a non-volatile memory device configured to store a plurality of dirty meta-slices that are updated meta-slices among a plurality of meta-slices, a plurality of journal entries including update information about a type of an operation which causes changes in some meta-slices among the plurality of meta-slices to the dirty meta-slices, and a plurality of journal replay contexts including index information on the dirty meta-slices;

a buffer memory configured to temporarily store information stored in the non-volatile memory device; and a memory controller configured to control the buffer memory to store a first journal replay context that is most recently stored in the non-volatile memory device among the plurality of journal replay contexts stored in the non-volatile memory device, wherein the memory controller generates an updated first journal replay context based on information of the plurality of dirty meta-slices stored in the non-volatile memory device after the first journal replay context is stored in the non-volatile memory device, wherein the non-volatile memory device includes a plurality of meta-slice maps including physical address information of the plurality of dirty meta-slices to be stored in the non-volatile memory device and a plurality of memory blocks each including a plurality of pages, and wherein the plurality of meta-slices correspond to a plurality of stripes, respectively, the plurality of stripes each including at least two or more pages among the plurality of pages.

9. The memory system of claim 8,
wherein each of the plurality of journal entries includes the physical address information of the first journal replay context and the physical address information of a first meta-slice map that is most recently stored in the non-volatile memory device among the plurality of meta-slice maps stored in the non-volatile memory device.

10. The memory system of claim 9,
wherein the memory controller updates the first meta-slice map based on the information of the plurality of dirty meta-slices stored after the first meta-slice map is stored in the non-volatile memory device, and controls the buffer memory to store an updated first meta-slice map.

11. The memory system of claim 10,
wherein the memory controller determines a plurality of rebuild meta-slices to be store in the buffer memory, based on the updated first journal replay context, and wherein the plurality of rebuild meta-slices are stored in the non-volatile memory device.

12. The memory system of claim 11,
wherein the memory controller determines a plurality of replay journal entries to be stored in the buffer memory, based on the updated first journal replay context and the updated first meta-slice map, and wherein the plurality of rebuild meta-slices are stored in the non-volatile memory device.

13. A method of operating a memory system, the method comprising:

generating a plurality of meta-slices corresponding to a plurality of stripes, respectively, the plurality of stripes each including a plurality of pages;

generating a journal entry including update information about a type of an operation which causes changes in one meta-slice among the plurality of meta-slices to a dirty meta-slice corresponding to an updated meta-slice among the plurality of meta-slices stored in a buffer memory;

storing the journal entry and the dirty meta-slice among the plurality of meta-slices in a non-volatile memory device, according to generating one journal entry, generating a meta-slice map including information of a physical address indicating a location to be stored of the dirty meta-slice in the non-volatile memory device;

generating a journal replay context including index information of the dirty meta-slice stored in the non-volatile memory device;

updating the meta-slice map, according to storing the dirty meta-slice and the journal entry in the non-volatile memory device;

updating the journal replay context, according to storing the dirty meta-slice and the journal entry in the non-volatile memory device; and storing an updated journal replay context and an updated meta-slice map in the non-volatile memory device.

14. The method according to claim 13,
wherein the updating the journal replay context comprises storing the index information of the dirty meta-slice stored in the non-volatile memory device in an order in which the dirty meta-slice is stored in the non-volatile memory device.

15. The method according to claim 13,
wherein the updating the journal replay context comprises deleting the index information of a dirty meta-slice stored in a journal entry context for the first time, in response to a number of index information in the journal entry context exceeding a threshold.

16. A method of operating a memory system including a non-volatile memory device including a plurality of dirty meta-slices that are updated meta-slices among a plurality of meta-slices corresponding to a plurality of stripes including at least two or more pages, respectively, a plurality of journal entries, a plurality of journal replay contexts and a plurality of meta-slice maps, the method comprising:

storing a first journal replay context that is last stored in the non-volatile memory device among the plurality of journal replay contexts and includes update information about a type of an operation which causes changes in some meta-slices among the plurality of meta-slices to the plurality of dirty meta-slices, respectively;

storing a first meta-slice map that is last stored in the non-volatile memory device among the plurality of meta-slice maps to a buffer memory and includes physical address information of the plurality of dirty meta-slices to be stored in the non-volatile memory device;

updating the first journal replay context and the first meta-slice map based on a plurality of dirty meta-slices stored in the non-volatile memory device after the first journal replay context and the first meta-slice map are stored in the non-volatile memory device;

determining a plurality of rebuild meta-slices to be stored in the buffer memory based on an updated first journal replay context;

determining a plurality of replay journal entries to be stored in the buffer memory based on the updated first journal replay context and an updated first meta-slice map; and storing the plurality of rebuild meta-slices stored in the non-volatile memory device and the plurality of replay journal entries stored in the non-volatile memory device to the buffer memory.

17. The method according to claim 16, wherein the updating the first journal replay context and the first meta-slice map comprises storing index information of the plurality of dirty meta-slices stored in the non-volatile memory device in an order in which the plurality of dirty meta-slices are stored in the non-volatile memory device.

\* \* \* \* \*